United States Patent [19]
Johnson et al.

[11] Patent Number: 5,459,670
[45] Date of Patent: Oct. 17, 1995

[54] SYSTEM AND METHOD FOR PROCESSING INTERNATIONAL MAIL

[75] Inventors: Jacob C. Johnson; Henriette Glazer, both of Alpine, N.J.; DeBorah Johnson, New York, N.Y.; John P. Michell, Ocean Grove, N.J.; Michael Michell, Toms River, N.J.; Mark Lev, Colonia, N.J.

[73] Assignee: Johnson & Hayward, Inc., New York, N.Y.

[21] Appl. No.: 138,498

[22] Filed: Oct. 18, 1993

Related U.S. Application Data

[63] Continuation-in-part of Ser. No. 883,535, May 19, 1992, Pat. No. 5,262,597.

[51] Int. Cl.$^6$ ............................................. G07B 17/00
[52] U.S. Cl. ...................... 364/478; 177/25.15; 209/584; 209/900; 364/464.02; 364/464.03
[58] Field of Search ................... 177/25.15; 209/584, 209/900; 364/464.02, 464.03, 478

[56] References Cited

U.S. PATENT DOCUMENTS

| | | | |
|---|---|---|---|
| 4,034,669 | 7/1977 | Freeman | 101/91 |
| 4,239,434 | 12/1980 | Gannon | 414/136 |
| 4,286,325 | 8/1981 | Dlugos et al. | 364/464.03 |
| 4,535,419 | 8/1985 | Dlugos et al. | 364/464.03 X |
| 4,674,052 | 6/1987 | Wong et al. | 364/464.03 |
| 4,790,119 | 12/1988 | McDaniels | 53/411 |
| 4,832,204 | 5/1989 | Handy et al. | 364/478 X |
| 5,008,827 | 4/1991 | Sansone et al. | 364/464.02 |
| 5,072,397 | 12/1991 | Barns-Slavin et al. | 364/464.02 |
| 5,119,306 | 6/1992 | Metelits et al. | 364/464.02 |
| 5,245,545 | 9/1993 | Taylor | 364/478 |
| 5,262,597 | 11/1993 | Johnson, Jr. | 364/464.01 X |

*Primary Examiner*—Edward R. Cosimano
*Attorney, Agent, or Firm*—Ohlandt, Greeley, Ruggiero & Perle

[57] ABSTRACT

There is provided a system for processing international mail. The system includes a weigh in station for weighing the total weight of received mail, a recordal station for recording the total number of pieces of received mail and for establishing criteria to identify the mail in the system, an affixing station, located downstream of the weighing and recordal stations, for affixing an indicia onto the mail and a sorting station, located downstream of the affixing station, for sorting the mail by country. The system also includes a processing unit that stores received information and processes the stored information to derive processed information, and a weighing and processing station located downstream of the sorting station. The weighing and processing station is operatively connected to the processing unit and, in conjunction with the processing unit, establishes a control weight per piece for identical pieces of mail to be sent to each country and determines the total number of pieces per country, and, if desired, separated into lightweight and heavyweight. The system further provides for the generating of reports based on the information processed by the processing unit.

20 Claims, 19 Drawing Sheets

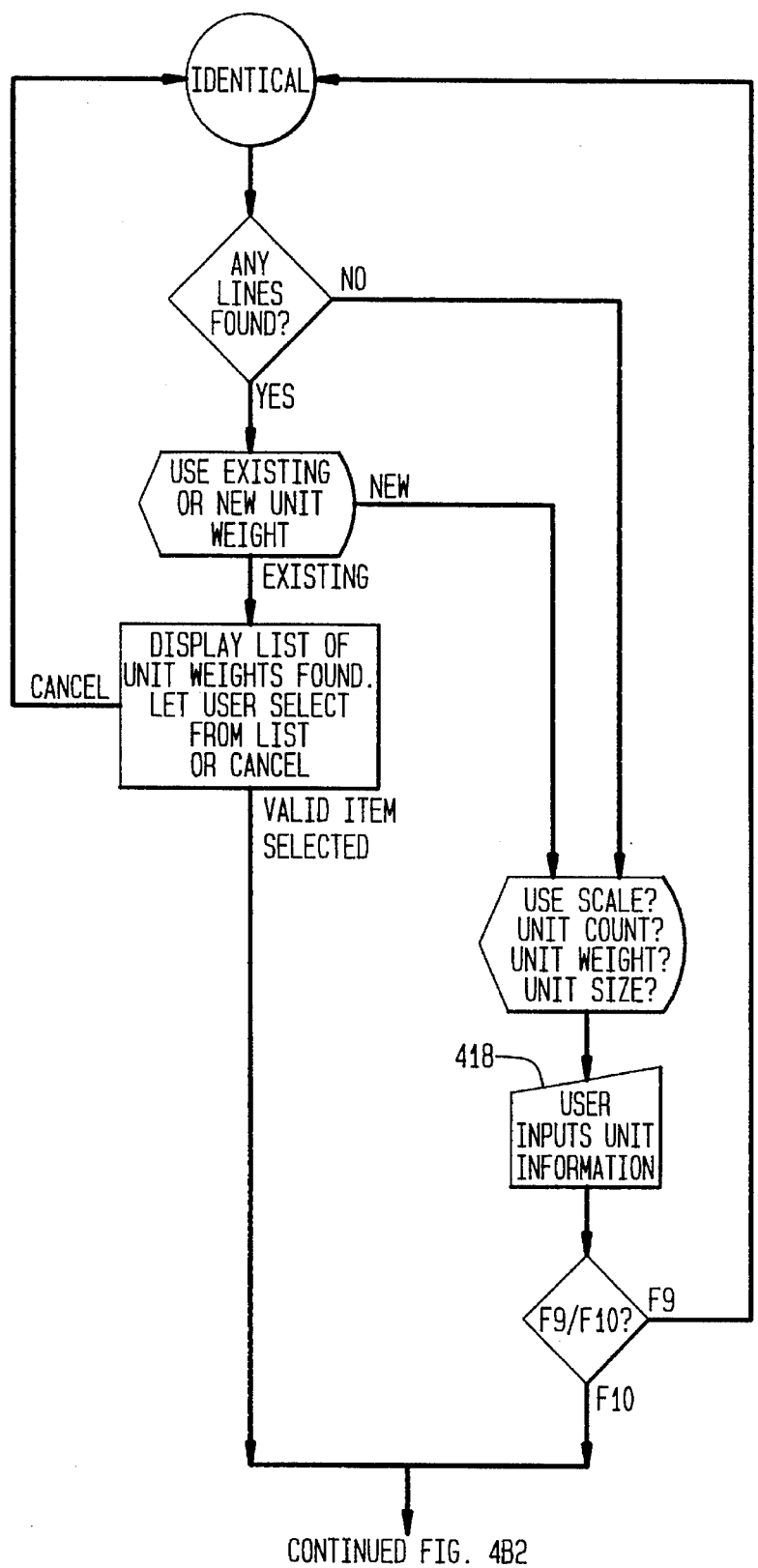
FIG. 4B1

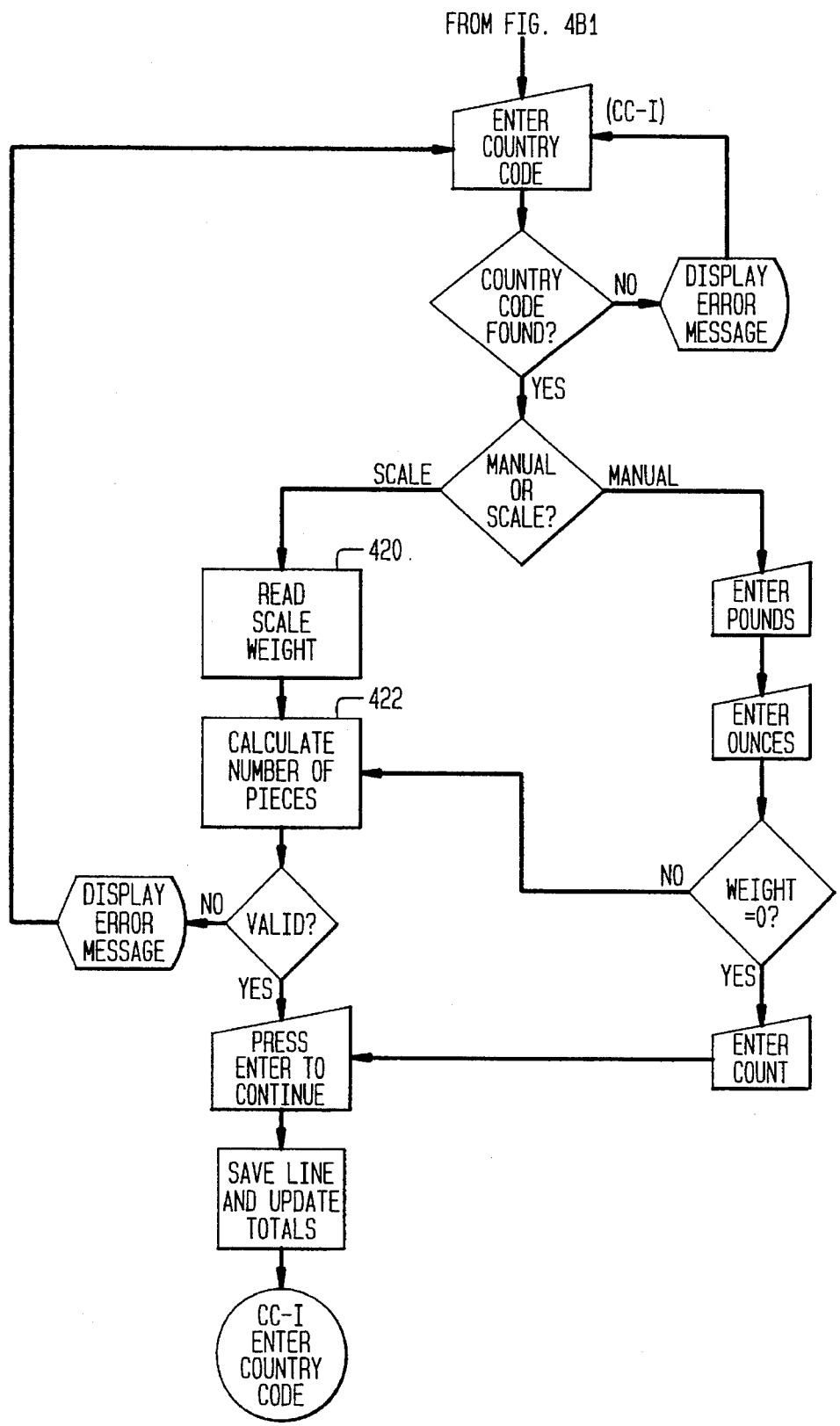
FIG. 4B2

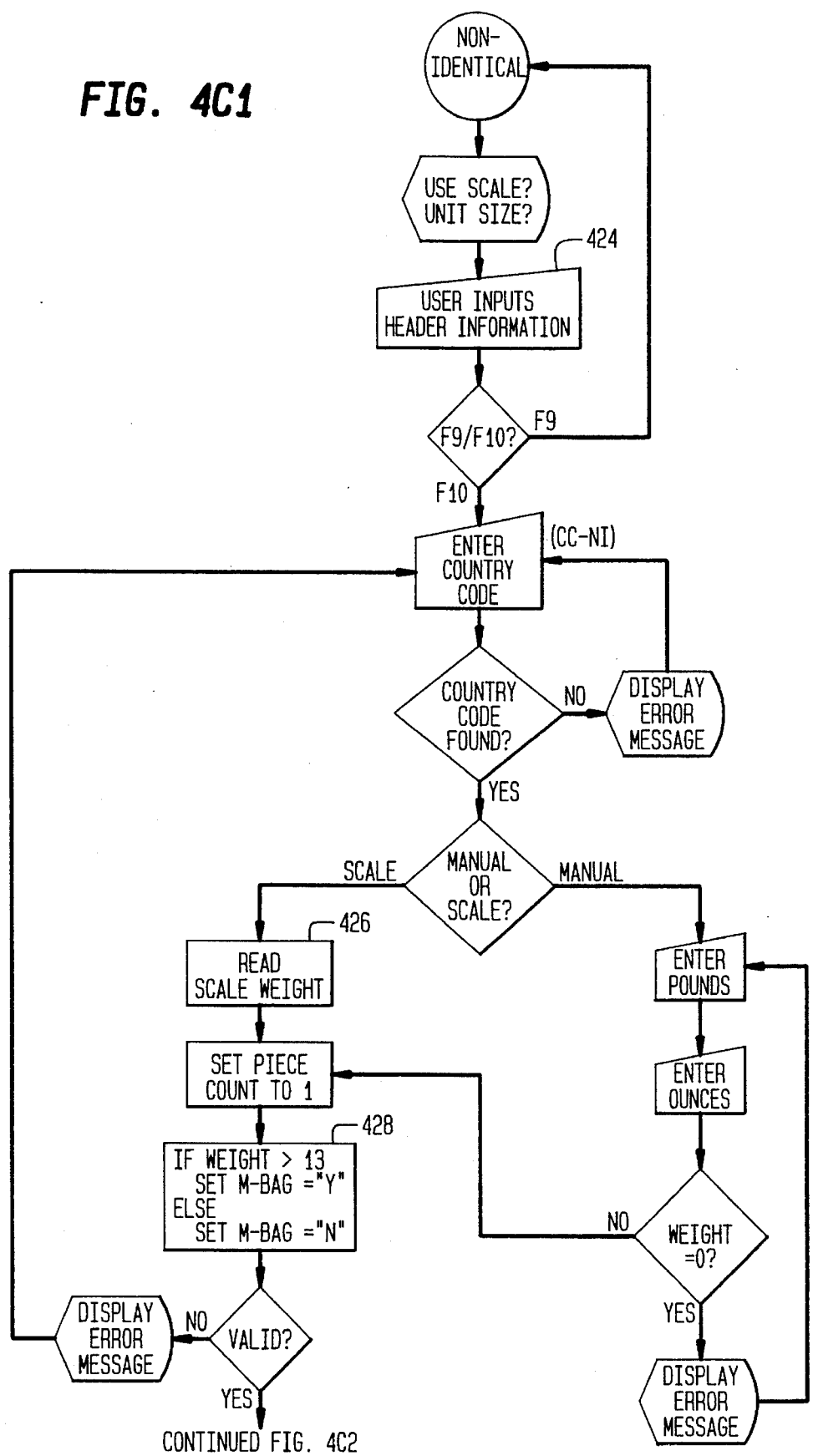
FIG. 4C1

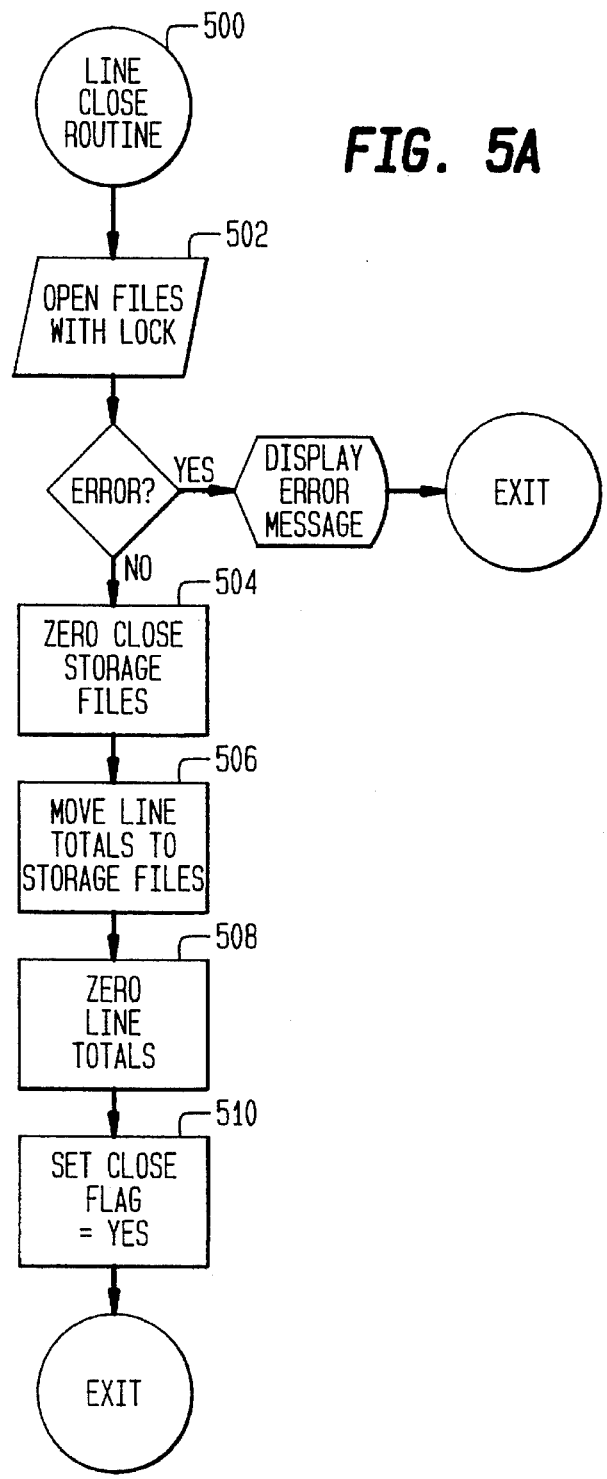

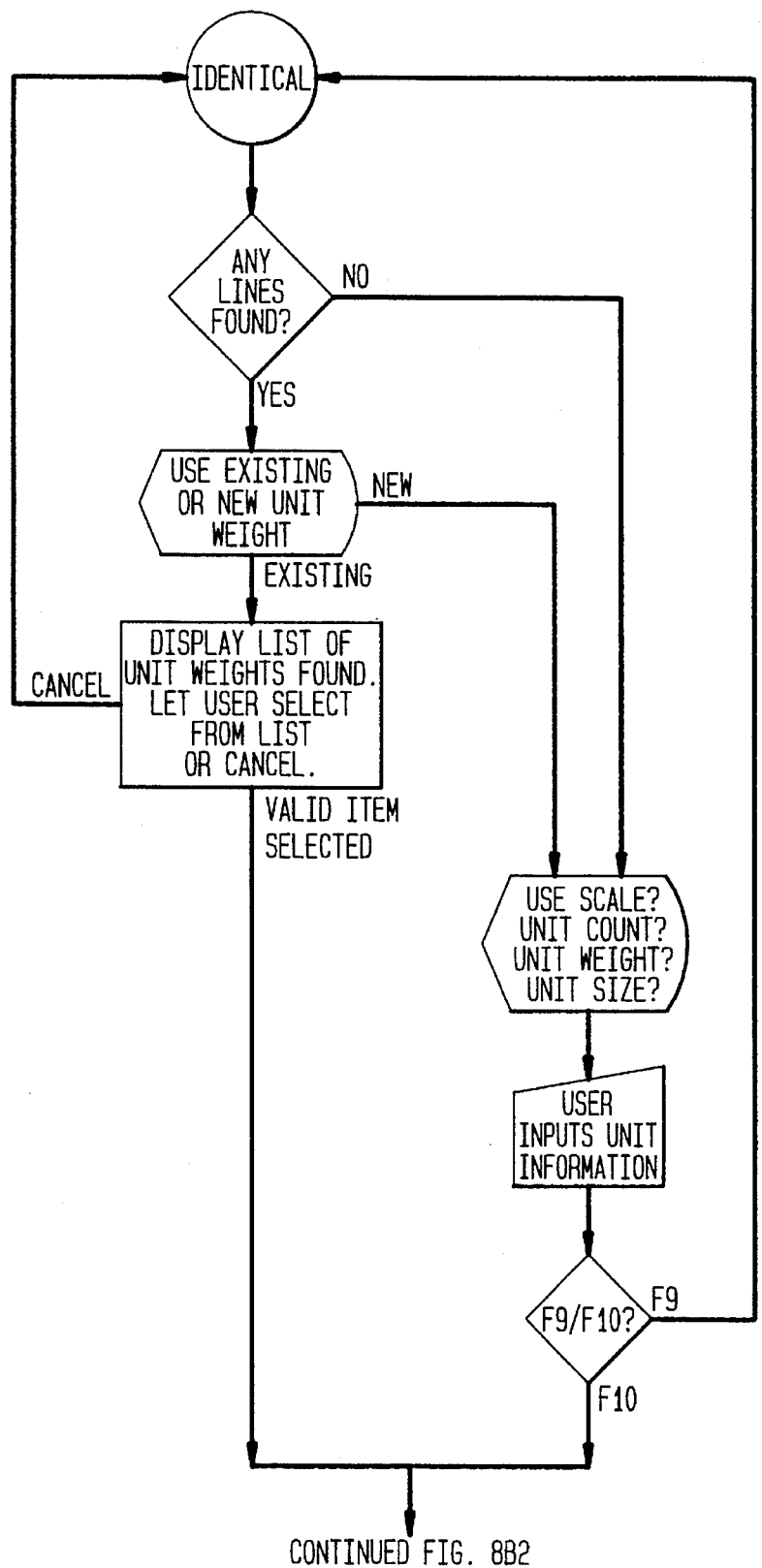
FIG. 8B1

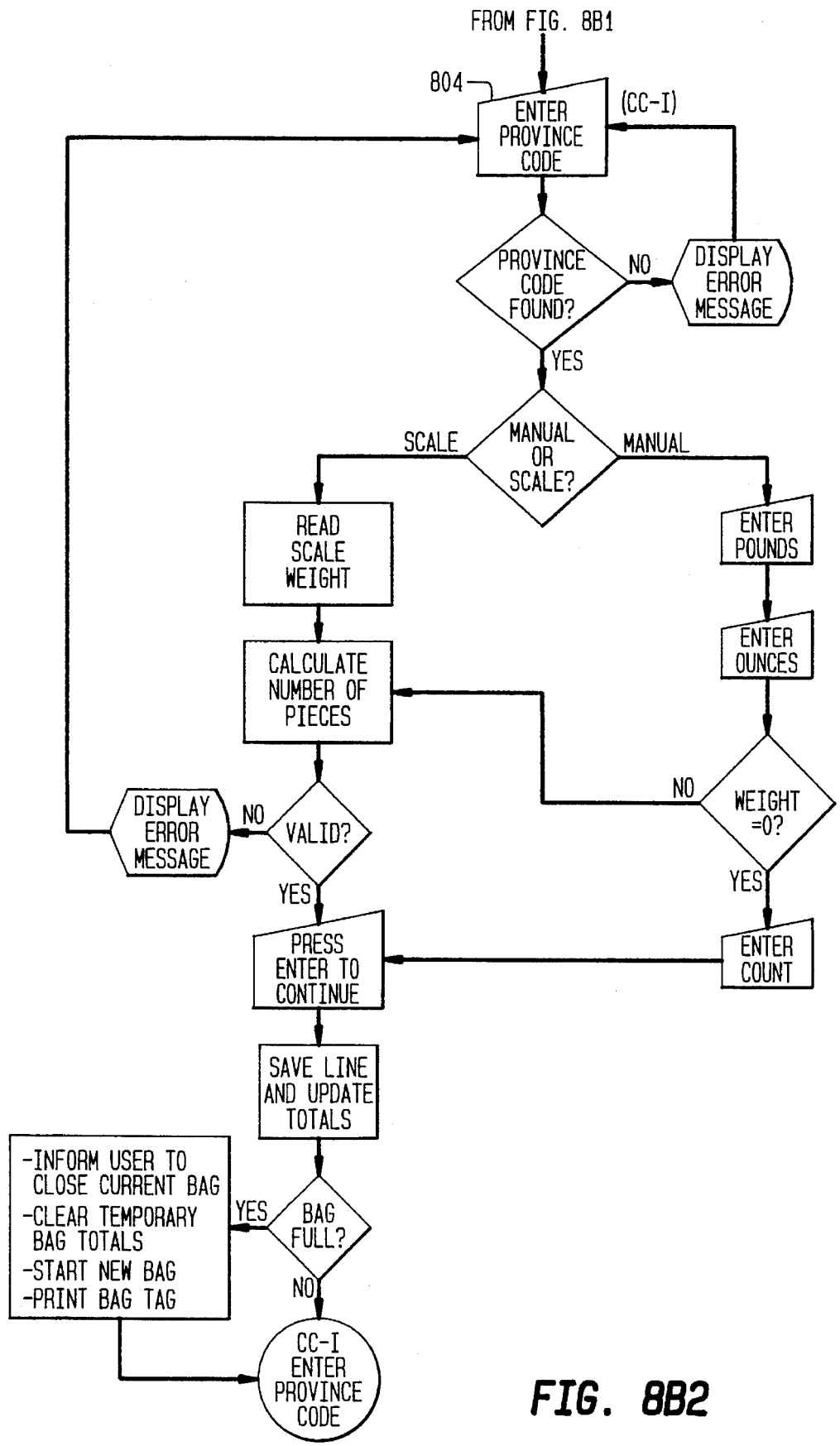
FIG. 8B2

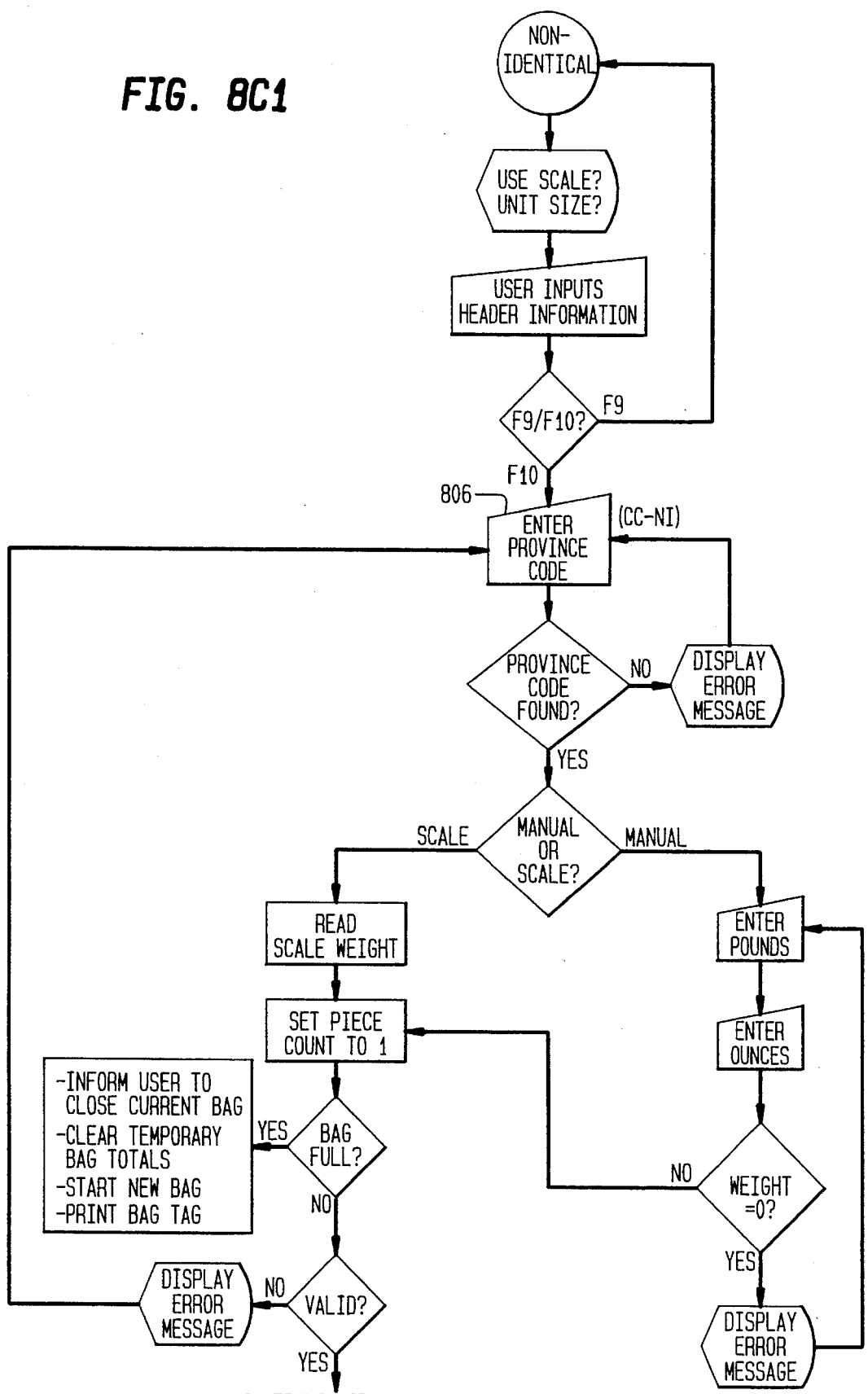
FIG. 8C1

FIG. 8C2

SYSTEM AND METHOD FOR PROCESSING INTERNATIONAL MAIL

This application is a continuation-in-part of application Ser. No. 07/883,535, filed May 15, 1992, now U.S. Pat. No. 5,262,597, which issued on Nov. 16, 1993.

BACKGROUND OF THE INVENTION

1. Field of the Invention

The present invention relates to a system and a method for processing mail. More particularly, it relates to a system and a method for processing all types of international mail. In order to obtain preferred postage rates, mail sent to international locations is presently categorized by the United States Postal Service (USPS) into three types of international mail.

Generally, the first type is International Priority Airmail (IPA) in which the USPS provides preferred postage rates for mailing of nonpresorted and presorted international priority airmail of all types sent to all countries of the world, except Canada. The second type is International Surface Airlift mail (ISAL) in which the USPS provides preferred postage rates for bulk mailing of printed matter to all countries of the world, except Canada. The third type is for mailing to Canada from the United States, and is known as Valuepost.

The above-identified priority application Ser. No. 07/883, 535, now U.S. Pat. No. 5,262,597 which is incorporated herein by reference, is directed to processing IPA mail. The present application is directed to a generic system for processing all types of international mail. In addition, it provides a new weighout feature to IPA, and the system for processing ISAL mail, and the system for processing Valuepost mail.

With respect to IPA mail, the USPS has, for some period of time, provided postage rate discounts for mailing large quantities and/or weight of letters, packages and the like to international locations. Particularly, the USPS provides preferred postage rates for mailing of nonpresorted and presorted international priority airmail sent to all countries of the world, except Canada. The previous IPA mail postage rate structure provided a flat per-pound rate for nonpresorted and presorted mail.

Recently, the USPS regulations have been dramatically changed concerning the postage discounts provided for IPA mail. While the new USPS regulations still provide a nonpresort rate option, they now provide for the presorted mail option a new international zone structure that has three rate groups. The rate in each group has both a per piece and a per pound rate component.

Each rate group corresponds to a different one of the three international zones established by the USPS. In each zone, there is a large number of countries. The countries are not classified by discrete geographical areas around the world, but instead are established passed on UPU terminal dues agreements with the United States. For example, group 1 includes many countries in the European market, such as Denmark, Finland, France, Germany, Great Britain, Italy, Netherlands, Norway and Sweden, yet it also includes Australia, but does not include Liechtenstein which is in group 2 and Switzerland which is in group 3.

The rates for the three rate groups for the presorted IPA mail presently range from 20 cents per piece and $4.95 per pound to 15 cents per piece and $7.95 per pound. Specifically, group 1 now has a per piece rate of 20 cents and a per pound rate of $4.95, group 2 has a per piece rate of 15 cents and a per pound rate of $6.15 per pound, and group 3 has a per piece rate of 15 cents and a per pound rate of $7.95. The rates in all three rate groups compare favorably to the nonpresort rate of 20 cents per piece and $8.00 per pound. Also, the rate for nonpresort international priority airmail compares favorably to simply mailing individually pieces of international airmail.

To obtain even the nonpresort rate, the total IPA mailing must be ten pounds or more. These requirements apply to the total mailing.

To obtain the more favorable presort rate, the mail must be sorted by country and zone and, in addition, meet the following requirements. The mail in a zone must weigh ten pounds or more and there must be either more than six pieces of mail per country in that zone or a weight of ten pounds or more for mail directed to each country in that zone.

The ability to process a heavy volume of international priority airmail, such as letters, sent by a single entity, such as, for example, a corporation or a bank, in any given day provides significant problems. That coupled with the necessity to comply with the USPS regulations in order to obtain the most advantageous postage rate, clearly creates even greater problems. Yet, the need to comply with the USPS regulations in order to obtain the most advantageous postage rate is readily apparent.

Concerning ISAL, the USPS has, for some period of time, also provided postage rate discounts for bulk mailing of publications, advertising material, catalogs, directories, books and other printed matter to international locations. The term "printed matter" is defined by the USPS to mean paper on which words, letters, characters, figures, or images, or any combination of them not having the character of a bill or statement of account, or of actual or personal correspondence, have been reproduced by any process other than handwritten or typewritten. Computer prepared material, magazines and the like are considered to be printed matter.

The ISAL program was created to offer preferential rates based on the proposition that customers perform some of the work, that would otherwise be performed by the USPS, needed to transmit the printed matter mail to international locations.

Previously, the ISAL mail postage rate structure of the USPS provided varying rates by country per pound of mail sent. Each country required its own rate and a separate postage statement for the total weight or poundage of mail sent to each country. Also, all mail needed to be identical nature, i.e. same size and weight. The mailer would affix postage, sort mail by country, bundle mail, bag and tag mailbags and deliver the prepared bagged mail to the USPS air facility. In this manner, the USPS would experience reduced labor and overhead, since bags of mail would be placed directly on planes for destination countries without any handling of individual pieces of mail by postal employees. The mailer was also responsible to meet minimum weight requirements, to prepare the mail pursuant to USPS regulations, and submit required postal forms for verification.

The postage rate structure has been adjusted a number of times to the present structure in which there are two rate categories, one is based on the destination by zone and the other is based on weight of the item. Specifically, individual items of 2 ozs. (a weight selected by the USPS) or less are called lightweights. They are charged at a flat per piece rate, presently 32 cents. Any item that is heavier than 2 ozs. is called a heavyweight, and is charged at a rate per pound based upon its destination to one of four zones. The four zones established by the USPS are Europe, Central and South America, the Pacific Rim and Africa/Middle East. The following is the present cost per pound in each zone: Europe is $2.90, Central South Americas are $3.25, Pacific Rim is $3.40, and Africa/Middle East are $4.20.

The current rate structure requires a total weight of mailing to be 50 lbs. or more to all destinations. The sortation and bagging requirements remain the same as set forth above. There is one set of rates for mail transported to anyone of the three USPS gateway airport locations that incorporates a 30 cents/lb. discount. Alternatively, mail can be dropped at any other acceptance city for the higher rate.

As with IPA, the ability to process any volume of ISAL mail sent by a single entity, such as a corporation or a bank, in any given day provides significant problems especially when attempting to obtain the most advantageous postage rate. Nevertheless, the need to comply is readily apparent.

Analogously, the USPS now also provides postage rate discounts or preferential postage rates for mailing of large quantities of printed matter to Canada. Valuepost was created based on the theory of a workshare arrangement between the USPS and its customers.

Prior to Valuepost, a mailer had the option of: (1) publisher's periodical or regular printed matter (both delivery times are very slow); (2) air printed matter, (3) airmail, or (4) first class mail. The latter three options are expensive. Alternatively, there was direct entry where it was necessary to clear Canadian customs and pay a goods and services tax (GST). With Valuepost, the bulk mailer now receives a cost effective rate with prompt service times of delivery.

Valuepost was developed with a letter size category and a flat size category for mailing large quantities of printed matter to Canada. The letter size category has been presently defined as mail having a height up to six and one-eight inches, a length or width of up to eleven and one-half inches, and a thickness of up to one-quarter of an inch. The flat size category has been presently defined as mail having a height up to eleven and one-half inches, a length of up to fifteen inches, and a thickness of up to three-quarters of an inch. The following rate structure applies to Valuepost. For letter size, any piece of mail 1 ounce (oz.) or less is charged at a per piece rate, presently 28 cents, while any letter over 1 oz. is charged at a second rate, presently 26 cents, per piece plus a third rate, presently 40 cents, per pound or fraction thereof. For flat size, any piece that weighs five ozs. or less is presently charged at a per piece rate of 53 cents, while any piece over 5 ozs. is charged at a second rate, presently 30 cents per piece, plus a third rate, presently $1.00, per pound or fraction of a pound.

Valuepost requires the mailers to affix postage, sort mail by Canadian province, bundle mail, bag and tag mailbags, and deliver the prepared bagged mail to a USPS Bulk Mail Center. In this manner, the USPS experiences reduced labor and overhead, as bags of mail can be sent directly to the Canadian Postal Service without any handling of individual pieces of mail by USPS employees. The mailer is responsible to meet minimum weight requirements, to prepare mail per regulation, and submit postal forms for verification. The current requirements now provide for a total weight per mailing to be 50 lbs. for letter class, 100 lbs. for flat class, or 100 lbs. for a mixed mailing of letter and flat classes.

2. Description of the Prior Art

Prior to the present invention, it has been virtually impossible to both process international mail and monitor it so as to comply with the above preferred postage rate requirements set forth by the USPS. Heretofore, one was required to have a large labor force to weigh virtually each letter or package and to individually sort each piece of mail and place the mail in the appropriate country bundle. Furthermore, detailed lists were manually compiled on a line by line basis for each piece of mail, and then manually compiled for a total. To prepare such lists, it is extremely time consuming and expensive.

There has not been, except for application Ser. No. 07/883,535, filed May 15, 1992, now U.S. Pat. No. 5,262,597, which issued on Nov. 16, 1993, cited above, a process or system that provides for the simultaneous weighing and recordal of information that leads to the compiling of the desired report. Further, there has not been a system that readily provides for the detailed breakdown needed in order to allocate the postage costs to various cost centers, such as individual clients or divisions within an organization or a system that provides within itself various check procedures to verify that processed international mail is correctly sorted and meets the requirements of the USPS.

Thus, the present system provides a comparatively economically efficient system for processing international mail that segregates the mail by geographic regions and, if desired, in zones each having several geographic regions, and provides a detailed breakdown of the number of pieces of mail in each geographic region in each zone and the weight of the mail in each geographic region in each zone.

When the present system is directed to processing ISAL mail, it segregates the mail within zones, and by country in each zone, and provides a detailed breakdown of the number of pieces of mail in each country in each zone and the weight of the mail in each country in each zone, as well as between lightweight and heavyweight mail within each zone. When the present system is directed to processing Valuepost mail, it segregates the mail by letter and flat class, and breaks down within those categories, the lightweight from the heavyweight mail, and provides a detailed breakdown of the number of pieces of mail in each province and in each class, and the weight of the mail in each province and in each class therefore allowing the commingling of mail.

SUMMARY OF THE INVENTION

It is the primary object of the present invention to provide an overall system for the processing of international mail.

It is another object of the present invention to provide such an overall system that is customized to form a system that sorts international priority airmail with a unique weighout feature.

It is still another object of the present invention to provide customized or species systems. A first customized system processes international priority airmail (IPA), a second customized system processes international surface airlift mail (ISAL) while a third customized system processes Canadian mail (Valuepost), into the presorted rate categories established by the USPS.

It is yet another object of the present invention to provide such second and third customized systems that provide detailed reports in which the second customized system breaks down the ISAL mail into lightweight and heavyweight categories and the international zones or four presort rate groups, and the third customized system breaks down the Valuepost mail into letters and flats categories, and within those categories, separates the mail into lightweight and heavyweight mail.

It is still yet another object of the present invention to provide such a second customized system that provides reports detailing in each rate group, each country therein, the number of pieces in each country, and the weight of the pieces in each country and a third customized system that provides reports detailing in each rate group, each province, the number of pieces of lightweight and heavyweight mail in each province, and the weight of the mail in each province.

It is a further object of the present invention to provide such an overall system that reports when the minimum weight requirement has not been met.

It is a still further object of the present invention to provide such an overall system that has verification checks to determine the accuracy of the system.

These and other objects are provided for by the present system for processing international mail. The system comprises: means for weighing the total weight of international mail; means for recording the total containers of international mail; means for establishing identification criteria for the international mail in the system; means, located downstream of the weighing, recordal and establishing means, for affixing indicia onto the international mail; and means, located downstream of the affixing means, for sorting the mail by geographic region. The system also comprises a processing means that includes means for storing received information and means for processing the stored information to derive processed information, and means, located downstream of the sorting means and operatively connected to the processing means, for establishing in conjunction with the processing means a control weight per piece for identical pieces of mail to be sent to each geographic region and determines the total number of pieces per geographic region. The system further comprises means for generating a report based on the information processed by the processing unit, and means for weighing the processed international mail for shipment. The system may include receiving means for receiving the incoming international mail.

The method of the present invention for processing international mail comprises: weighing the total weight of the international mail received, recording the total number of containers or pieces of the international mail and establishing identification criteria for the international mail in the system; thereafter affixing indicia onto the international mail and sorting by geographic region. The method also includes weighing the sorted international mail, and recording and storing the number of pieces in the system. The method further includes processing the stored information to derive processed information, wherein the information stored in conjunction with the information processed establishes a control weight per piece for identical pieces of international mail to be sent to each geographic region and determines the total number of pieces per geographic region. The method further comprises generating a report based on the processed information, and weighing out the processed international mail.

The present invention can provide for processing of ISAL mail so that a report unique to this system is generated. This report includes breakdown portions and a summary portion. The first breakdown portion is separated into four sections, each for a different international zone established by the USPS. Within each zone, there is included a country code, country name, the number of lightweight (2 ozs. or less) units or pieces per country and the weight for the number of lightweight units per country, the number of heavyweight (over 2 ozs.) units or pieces per country and the weight for the number of heavyweight units per country, the total number of units or pieces per country and the total weight for the number of units per country.

The second breakdown portion is separated into four sections, each for a different international zone established by the USPS. Within each zone, there is included a country code, a country name, the number of regular bags per country and the weight for the number of regular bags per country, the number of M-bags per country and the weight of the number of M-bags per country, the total number of bags per country, and the total weight for the total number of bags per country. An M-bag is presently defined as a bag of a single stack of mail to one address with minimum weight of thirteen pounds and a maximum weight of sixty-six pounds.

The summary portion includes a breakdown of the four international groups. Each international group is broken down by lightweight mail, heavyweight mail and M-Bags. Within each breakdown, is the number of pieces, the weight in lbs., the rate at which pieces or lbs. will be billed, the total cost of postage for pieces, lbs., or M-Bags within that group, the weight in kilograms, and the total number of bags for that group.

The summary portion of the report also includes a section that gives a breakdown of the subtotals for: the total weight of lightweight mail and its total cost, the total M-Bag weight and its total cost, the total weight of heavyweight mail and its total costs, the total number of pieces of lightweight and heavyweight mail, and the total weight of all lightweight mail minus the discount. From this subtotal, the report generates the total cost of the mailing. In each section, the number of pieces, the number of lbs. and the mathematics of the price per piece and price per pound are provided, along with the summary of the total postage rate.

The present invention can also provide for the processing of Valuepost mail or mail to Canada. The system applies indicia that distinguishes the mail as bulk rate Canadian mail. The combined weighing and recording means and sorting by geographic region the Valuepost mail in conjunction with the storing and processing means establish a control weight per piece for identical pieces of mail to be sent to each province. The report generated by this subsystem is specifically directed to mail to Canada and includes a weight shipped by postal code breakdown portion and a weight shipped by province summary portion.

Significantly, the system for processing Valuepost mail provides a breakdown portion that separates letter class and flat class, showing the total weight shipped to each province. Within each class, there is included a region code, a region name, the number of bags for each letter or flat class region, and the weight in both pounds and kilograms. The summary portion includes a breakdown of the letter and flat size classes, with each class broken down by bag, and separation by lightweights and heavyweights within that bag. The reports also include a total shipment summary that provides the cost breakdown for letter size class by taking the number of letters weighing 1 oz. or less (Valuepost letter size lightweight) and multiplying that number by the fixed rate, presently 28 cents, then taking the total pieces of letter class mail over one (1) ounce (Valuepost letter size heavyweight) and multiplying that by the fixed rate, presently 26 cents, and the total pounds of Valuepost letter size heavyweight by 40 cents per pound. The total shipment summary also provides a cost breakdown for flat size class by taking the number of flat size class mail weighing 5 ozs. or less (Valuepost flat size lightweight) and multiplying that by the present fixed rate of 53 cents, then taking the total pieces of flat size class mail over 5 ounces (Valuepost flat size heavyweight) and multiplying that by the present fixed rate of 30 cents, and the total pounds of Valuepost flat size heavyweight mail by one (1) dollar per pound.

BRIEF DESCRIPTION OF THE DRAWINGS

The foregoing and still other objects and advantages of the present invention will be more apparent from the following detailed explanation of the preferred embodiments of the invention in connection with the accompanying drawings wherein:

FIG. 4 consists of FIGS. 4A–4C2,

FIG. 5 consists of FIGS. 5A to 5C, with

FIG. 5A being the logic diagram for the routine and process for closing line processing, FIG. 5B being the logic diagram for the closing bag weighout, and FIG. 5C being the logic diagram for the generation of the closing reports for the IPA, ISAL and Valuepost systems.

FIG. 8 consists of FIGS. 8A–8C2, with

DETAILED DESCRIPTION OF THE PREFERRED EMBODIMENTS

Figure 1:
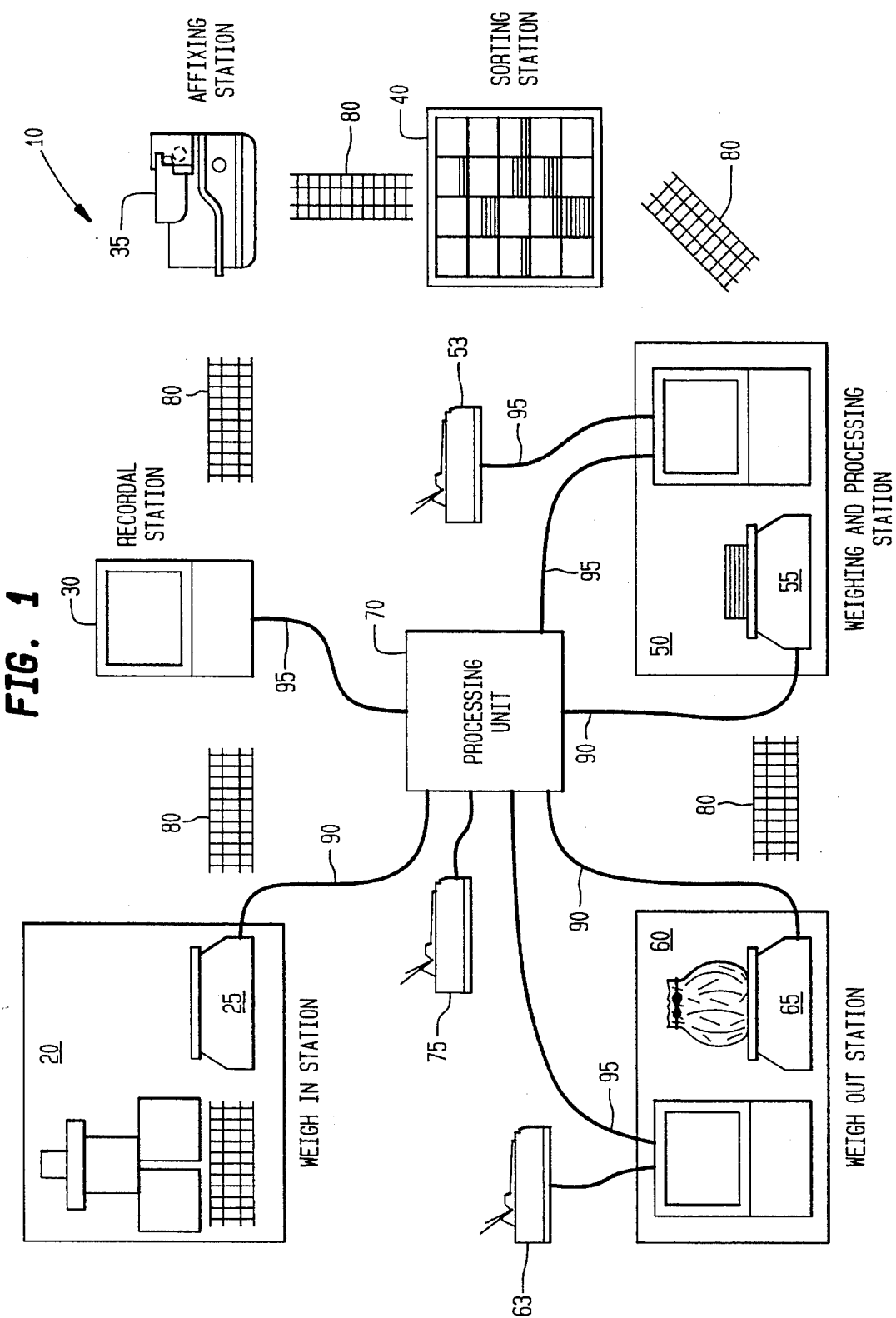
FIG. 1 is a block diagram of the overall system of the present invention.

Referring to the drawings and, in particular, FIG. 1, a system for processing international mail according to the present invention is generally represented by reference numeral 10. The system 10, is analogous to that in priority U.S. application Ser. No. 07/883,535, now U.S. Pat. No. 5,262,597, cited above, and includes: a weigh in station 20 for weighing the total weight of the international mail received from an entity; a recordal station 30, either as part of or separate from the weigh in station, for recording the total number of containers of international mail and for identifying by a job number or the like the international mail received into the system; an affixing station 35, located downstream of the weigh in and recordal stations, for affixing an indicia on each piece of international mail, and a mail sorting station 40, located downstream of the affixing station, for sorting the international mail by geographic region. In the IPA and ISAL systems, each geographic region is a country, while in the Valuepost system each geographic region is a province of Canada.

The system 10 also includes: a weighing and processing station 50 located downstream of the sorting station, a shipment or weigh out station 60, located downstream of the weighing and processing station, for weighing the processed international mail prior to shipment, and a processing unit 70 operatively connected to the weigh in and recordal stations, the weighing and processing station and the weigh out station. The processing unit 70 is also operatively connected to a printer 75 to generate reports based on the information obtained by the system and stored in the memory of the processing unit.

The weighing and processing station 50 in conjunction with the processing unit 70 establishes a control weight per piece per job for identical international mail. In addition, the weighing and processing station 50 in conjunction with the processing unit 70 determines the total number of pieces per geographic region, as well as the determination of whether the pieces are lightweight or heavyweight mail within the ISAL and Valuepost systems.

The system 10 may include a receiving station for receiving the incoming international mail, that would be located upstream of the weigh in station 20.

Each station of the system 10 is operatively connected to the adjacent stations in order to expeditiously move the mail from one station to the next station. This operative connection can be any conventional means of moving mail, such as, for example, a conveyor belt or a bed of rollers 80.

The weigh in station 20 weighs the total mail received from a source or entity, such as, for example, a client or customer or a cost center in a company or association. The preferred weigh in station 20 includes a scale 25. The scale 25 is any conventional scale that can register large weights. The scale 25, and therefore the weigh in station 20, are operatively connected by conventional electrical wiring 90 to memory in a processing unit 70 that stores the weight recorded by the scale. This electrical connection is preferably a direct electrical connection. When the international mail is placed on the scale, the recorded weight is automatically stored in the memory of the processing unit 70.

The recordal station 30 is preferably positioned downstream of the weigh in station 20 and is operatively connected to forward the mail to the weigh in station. It is anticipated, however, that the recordal station 30 can be the first station, i.e. located upstream of the weigh in station 20. In the most preferred embodiment, the weigh in and recordal stations are a single station.

The recordal station 30 is where the number of total containers of mail received from the source is recorded into the memory of the processing unit 70. The recordal station 30 preferably includes input means, such as, for example, a conventional keyboard that is connected by electrical wiring 95 to the processing unit 70 so that the total number or piece count can be manually inputted by keyboard into the memory. Alternatively, the total number or piece count can be scanned into the memory of the processing unit 70 by a conventional scanner, however this would require that each piece pass the scanner, which is an unnecessary use of time.

The recordal station 30 is also the proper position to assign identification information, such as, a work number or job number to the assignment. In addition, other identification information, such as the clients name, billing address and the like, can be inputted into the memory of the processing unit 70.

Figure 2:
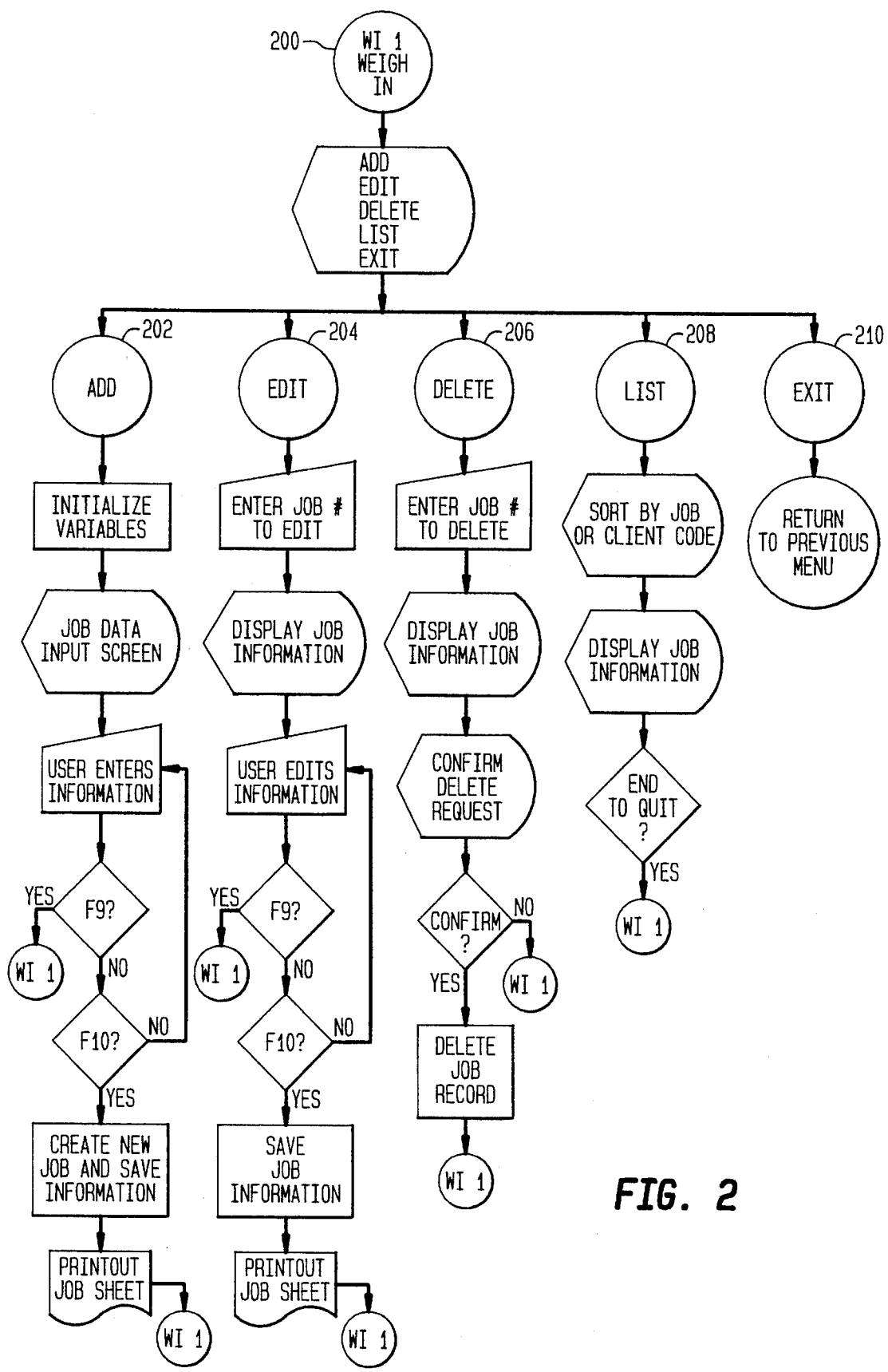
FIG. 2 is the logic diagram of the weigh in routine for the system and all customized systems of FIG. 1.

FIG. 2 illustrates the processing routine or sequence stored in the memory of the processing unit 70 that is used in conjunction with the weigh in 20 and recordal station 30. As shown, the pertinent information and the piece or unit count is derived from the recordal station 30, while the total weight is derived from the scale 25 in the weigh in station 20. This weigh in routine (WI 1 is the start position 200), which is used in the overall system as well as the IPA, ISAL and Valuepost systems, permits the operator to add 202, edit 204, delete 206 and list data 208, as well as directly exit 210 the weigh in (WI 1) process or routine. The particular steps for each is clearly set forth in FIG. 2.

Referring again to FIG. 1, the affixing station 35 is located downstream of the weigh in station 20 and the recordal station 30. In the preferred embodiment, the affixing station 35 is located immediately downstream of the recordal station 30. The affixing station 35 affixes the indicia including meter markings to each piece of international mail. The indicia is affixed by conventional means, such as, for example, a stamp or meter. The indicia that is affixed indicates the postage paid out of a postage account recorded with the USPS. Basically, it has the postage account or meter number or the amount of postage.

The sorting station 40 is located downstream of the affixing station 35 and is operatively connected thereto, as stated above, to physically move the international mail. At the sorting station 40, the mail is separated or sorted by geographic region, such as, for example, by country or province. This task is presently performed manually, however, it is anticipated that this task will be, in the future, performed by machine. For example, the mail is received with an address label thereon that provides the information as to the geographic destination. In the case of the IPA and ISAL systems, the destinations are countries of the world, while in the Valuepost system the destination are provinces of Canada. It is believed that some bar code on the address label can be placed that will respond to a scanner and thereby indicate the pile or bundle where the mail should be directed.

Positioned down stream of the sorting station 40 and operatively connected thereto by the conveyor 80 in order to forward the mail, is the weighing and processing station 50. In addition, the weighing and processing station 50 is also operatively connected by conventional electrical wiring 95 to the processing unit 70. The processing unit 70 may, in fact, be located at this station or, alternatively, it can be located at a remote location with a keyboard or the like provided at this station to input information into the processing unit. The weighing and processing station 50, serves several functions, and includes a weighing means, such as a conventional scale 55, to weigh all mail placed thereon, and to record the weight in the processing unit 70. The scale of the weighing and processing station 50 could be the same scale that is used in the weigh in station 20. It is preferred, however, that a separate scale be used in this station 50. The scale 55 is electrically and operatively connected to the processing unit 70 by electrical wiring 90. In a preferred embodiment, the scale 55 is directly connected to the processing unit 70.

Figure 3:
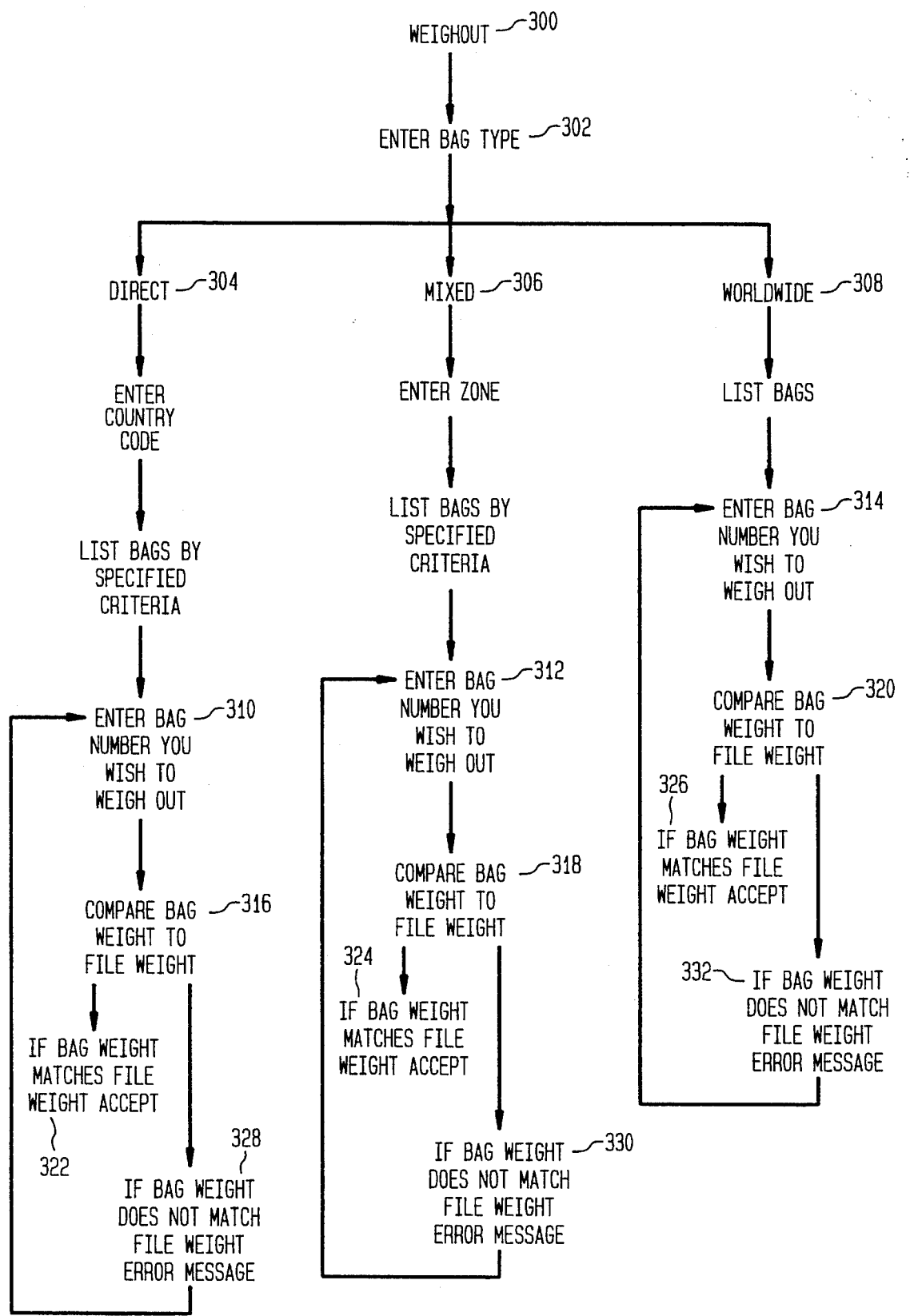
FIG. 3 is the logic diagram of the weighout feature used in the IPA system.

For the IPA system, there is a unique weighout procedure shown in FIG. 3 (starting at step 300). Basically, the type of bag is entered 302 by conventional means, such as, for example, a keyboard into the computer. As shown in FIG. 3, the keyboard operator selects whether the type of mail bag is going (a) direct 304, or (b) mixed 306, or (c) worldwide 308. Direct means that ten (10) or more pounds of mail are to be sent to one country, while mixed means that there are two or more countries in a zone with six or more pieces of mail, however the weight of each individual country does not equal ten pounds. Worldwide means that all pieces of mail are mixed from all zones and a country piece count is less than six pieces.

The bag number that is to be weighed out is entered 310, 312 & 314, and automatically the bag's weight and the file weight are compared 316, 318 & 320. If the bag and file weights match, the weight is accepted 322, 324 & 326 into the file in the memory of the processing unit 70. However, if the bag weights do not match, an error message is generated 328, 330 & 332 thereby notifying that the contents of the bag must be reviewed.

Figure 4A:
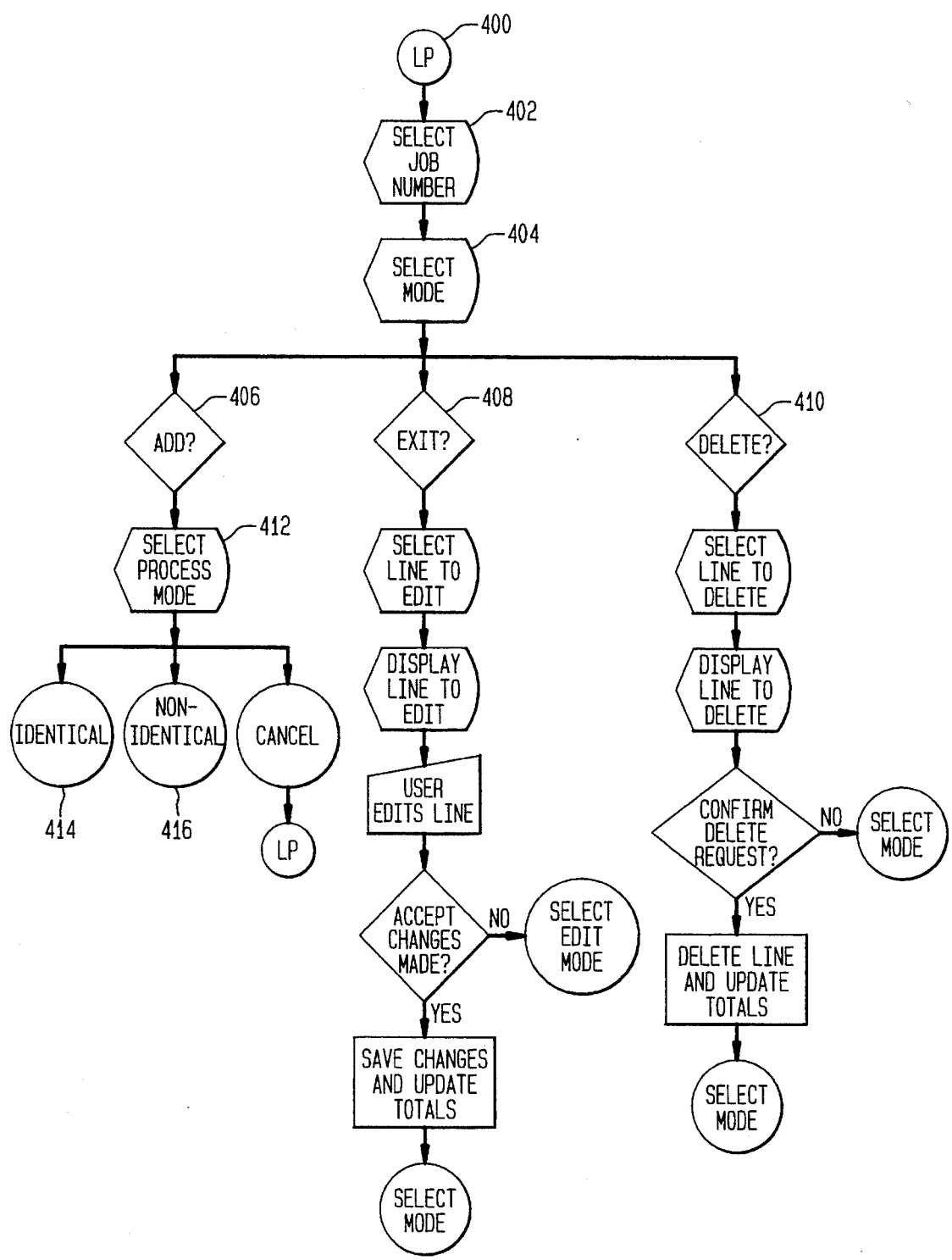
FIG. 4A being the logic diagram of the weighing and processing routine (line process) for the ISAL system, FIGS. 4B1 and 4B2 being the logic diagrams for the identical routine, while FIGS. 4C1 and 4C2 being logic diagrams of the non-identical routine.

FIG. 4A is the line process (LP) routine that is unique to the ISAL system. The process routine (starting at step 400) in conjunction with the weighing and processing station 50 establishes a control weight per piece, as well as identifying the piece of mail as a lightweight or a heavyweight for all identical mail in a country. For ISAL mail, the USPS has presently defined lightweight mail as 2 ozs. or less, and has presently defined heavyweight mail as over 2 ozs.

To establish the control weight, first determine whether there are a number of pieces of mail per country, as received from the sorting means 40, that are identical in size and weight. To be considered identical in weight, the tolerance or differences in the weight of two packages or items of printed matter is less than 1/100 of an ounce. If several pieces of mail are identical, the average weight per piece, or control weight, is obtained in the following manner.

Place a number of identical pieces, preferably ten, since this number is both a convenient number to count and is the standard used by the USPS, on the scale 55. The weight is automatically recorded in the memory of the processing unit 70. Then, the number of pieces placed on the scale is inputted into the processing unit 70 by the input means 418. For identical pieces, the input of the number of pieces into the processing unit 70 and the automatic recordal of the weight on the scale 55 and the storing of the recorded weight in the processing unit are variables that in connection with the process set forth in FIGS. 4B1 and 4B2, provide the average weight per piece per country for all identical pieces. Once this is achieved, the entire bundle of identical mail can be placed on the scale and the process in the processing unit 70 will automatically record and store the entire weight 420. The process in the processing unit 70 will calculate the average weight per piece, and will determine the number of pieces in the bundle 422.

FIGS. 4C1 and 4C2 provide the logic for non-identical mail. For non-identical pieces, each piece has to be inputted separately 424. The present system 10 will still expedite this since the scale automatically weighs the piece and the recorded weight is automatically inputted 426 into the processing unit 70. In addition, the inputted information and the recorded information are immediately stored in the memory of the processing unit 70 and available for immediate processing by the process or routine, shown in FIGS. 4C1 and 4C2. As shown in FIG. 4C1, if the non-identical entry is greater than a desired weight, presently thirteen pounds, it will automatically be marked as an M-bag 428.

The LP process of FIG. 4 can be simply stated as follows. The initial screen or screens provide a job number selection screen 402, and then a job select mode 404, namely add 406, edit 408 or delete 410. If the add mode 406 is selected, the operator must then select 412 whether the pieces or units are to be classified as identical 414 or non-identical 416.

If the identical routine shown in FIGS. 4B1 and 4B2 is selected, the unit size of the piece of mail must be entered or inputted either by scanner or, at present, manually. The scale has automatically forwarded the recorded weight so that the process then automatically calculates by country the number of pieces.

If the non-identical routine shown in FIGS. 4C1 and 4C2 is selected, the unit size of the piece of mail must be entered or inputted, and the scale, if desired, automatically weighs the piece of mail. The information for this non-identical mail is commingled with the identical mail and included in the printed report set forth above.

As shown in FIG. 4A, there are also edit 408 and delete 410 line screens or steps that permit the operator to edit or delete information that has already been entered, instead of adding information 406, such as identical 414 and non-identical 416 piece information discussed above. (Enter in the figures means information entered by the input means or operator)

The weighout station 60 is connected to the processing unit 70 by electrical wiring 90. To weighout the processed mail, e.g. mail that has completed the weighing and processing station 50 and has been bagged by country, the mail is placed on the scale 65 at weighout station 60.

Figure 6:
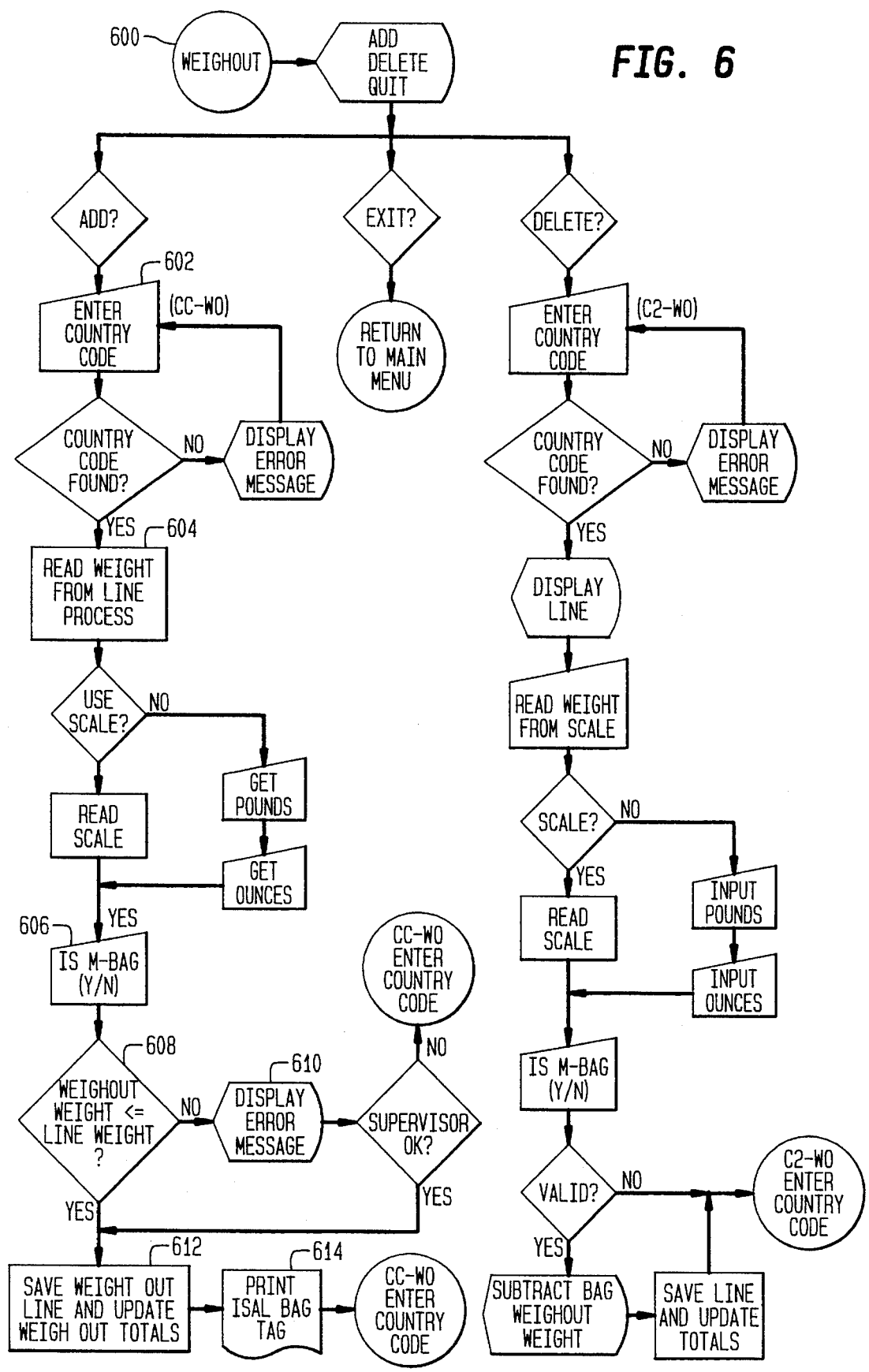
FIG. 6 is the weighout routine for the ISAL system.

As shown in FIG. 6, through the input means, the country code information for the mailbag is entered 602. The routine shown in FIG. 6 (starting at step 600) is unique to the ISAL system since it factors in whether a M-bag is used. (An M-bag is not used in the Valuepost or IPA systems.) The amount of weight that has been processed at station 50 for the particular country will be checked. The operator will enter the weight of this country bag 604. The operator will, preferably, be prompted for a response, such as, for example, "Is this an M-bag? Y/N" 606. Once this question is answered by the operator, the system will compare 608 the processed weight from station 50 against the weighout weight derived at station 60. If the weighout weight is greater, the operator will get an error message 610, that will indicate an error in bagging. Thus, the operator is notified to check all mail within that country to make certain that the mail was bagged properly.

If no error message occurs, the system will save the weighout weight, and update that country's weighout total 612. Also, the system will print a bag tag 614. The bag tag is created by a bag tagger 63 shown in FIG. 1. In the ISAL system, the bag tagger 63 is connected to the weighout station 60 by electrical wiring 95. The bag tagger prints a tag for each bag of mail that is weighed out based on a signal induced by the weighout file.

The bag tag is derived from the weighout file and includes the following information: three digit city destination code, city name, country mail name, departure airport, weight of the bag in both pounds and kilograms, date of mailing and mailer identification number.

The processing unit 70 has a memory that stores inputted information, as well as the logic or processing routines shown in FIGS. 3 through 7 of the present invention. In short, the processing unit 70 includes in its memory the following processes or routines: the weigh in process, the line (or weighing and processing process), the weighout process, the closing report routine, the billing report routine and the department maintenance, postal maintenance and country list maintenance routines.

The maintenance routines permit the user to make necessary corrections or changes to logic files used in the creation of all report files. For example, the department maintenance routine permits the user to correct clients names, codes, addresses or billing format. The postal maintenance routine permits the user to make the changes that occur in the USPS pricing structure. The country list maintenance routine permits the user to correct, amend or add country list files and thereby maintain any to the USPS regulations. These routines, though important for maintaining the current system, are not part of system 10 needed to process the mail.

The processing unit 70 has conventional programming to instruct the printer 75 to generate a report based on information stored in the processing unit. Thus, in the ISAL system, the memory of the processing unit 70 stores the desired information, such as the country code that has been developed to unambiguously identify by code each country of the world, except Canada and the United States, the allocation of each country to one of the four established international zones that are unique to processing ISAL mail, each country name, and international zone rate postage information.

Figure 5B:
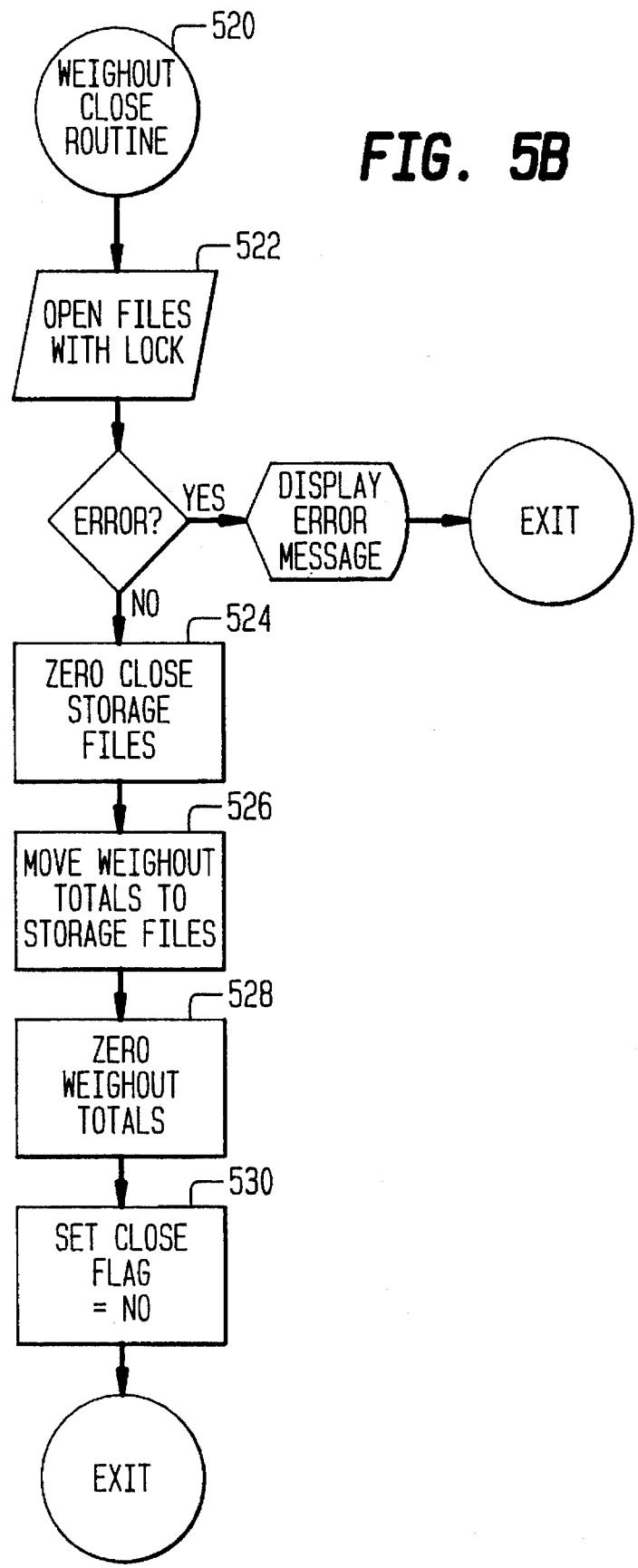
Figure 5C:
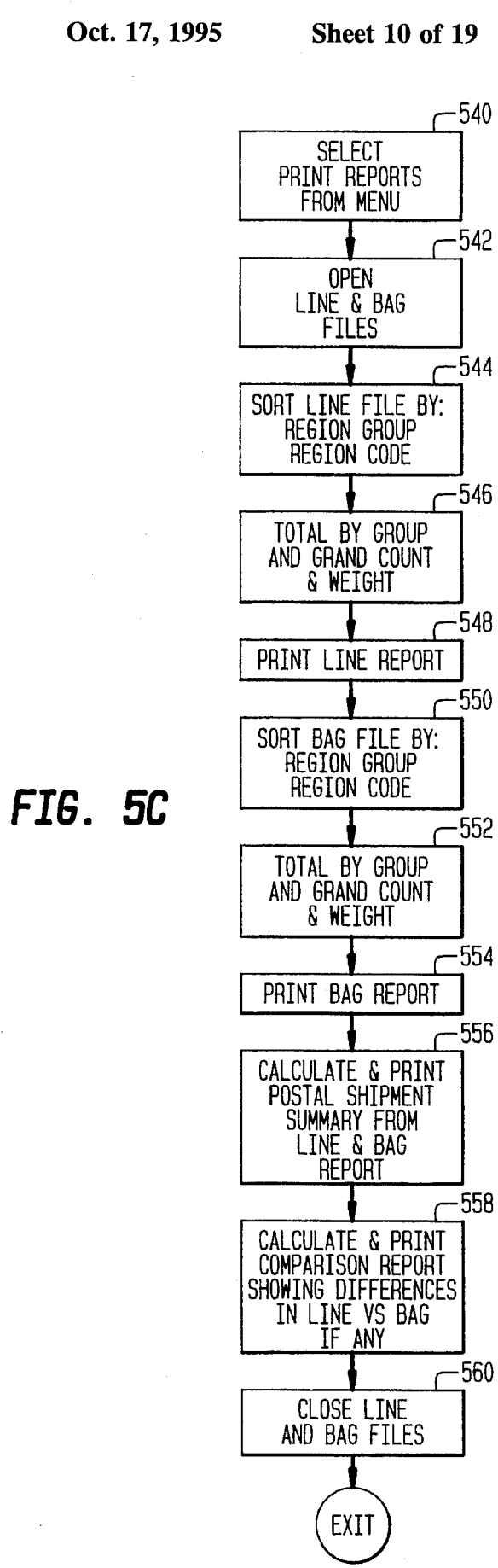

When the decision has been made that you are ready to close, e.g. stop processing mail, and you have processed the last of the mail at station 50, you will begin the close process. The close process will comprise of three steps as shown in FIGS. 5A through 5C. All three systems, namely IPA, ISAL and Valuepost, use these close processes, however the Valuepost has an additional process prior to commencement of the close processes. These processes are as follows:

The line close routine (starting at step 500) is shown in FIG. 5A. This routine is normally initiated from a remote location, and can be initiated at either station 30, 50 or 60, since all stations are interfaced by electrical wiring 90 to the processing unit 70. The line close routine that is stored in the processing unit 70 will take all information that was entered at the weighing and processing station 50, and flag it as belonging to the current close 502. Next, it will zero all close storage files from the previous close 504, and update that file with the current line totals 506. Then, the line totals that were saved from the information generated at station 50 will be zeroed 508. The system will now set the close flag=YES 510. This flag indicates that a line close has been run and will not allow the processing of any mail through station 50 until the flag has been set=No by the weighout close routine.

The weighout close routine (starting at step 520) is shown in FIG. 5B is also normally initiated from a remote location. Specifically, it can be initiated at stations 30, 50 or 60, since all these stations can be, and preferably are interfaced by electrical wiring 90 to the processing unit 70. The weighout close routine that is stored in the processing unit 70 receives all the information that has been entered at the weighing and processing station 50 for this close 522, and flag it as belonging to the current close. A safety feature provided in this system will not allow a weighout close routine to be run unless the line close routine has been run. It will then zero all close storage files from the previous weighout close 524, and update that file with the current bag totals 526. Next, the program will zero the bag totals 528 that were saved from the information generated at station 60. The system will now set the close flag=No 530. This flag will indicate that the line close routine and weighout close routine have both been run, and will allow for the processing at station 50 to resume.

After the line close routine and the weighout close routine have been run and stored in the memory of the processing unit 70, the close report routine shown in FIG. 5C can be run (starting at step 540). The routine for this report can also be initiated from a remote location, such as, stations 30, 50 or 60.

When the close report routine is initiated 540, it will follow the following logical sequence: the line and bags files that were created in the previous process will be opened 542, and the line file will be sorted by country code and country within each zone 544. Then, the total count by country and weight, broken down by lightweight and heavyweight piece for ISAL and Valuepost, and also by letter size and flat size classes within Valuepost, will be obtained 546, and the line report will be generated 548.

The bag file will be sorted by country and country code within each zone 550. A total count of the R or regular bags, which are simply regular type mailbags with their weight and M-bags within the ISAL system with their weight, will be obtained 552 and the bag report will be generated 554. The system will then calculate and print a postal shipment summary from the line and Bag reports 556.

The postal shipment summary report generated by the processing unit 70 in conjunction with the stations of the present system, especially the weighing and processing station 50, includes two breakdown portions and a summary portion of the report.

The first breakdown portion is separated into four sections, each for a different one of the four international zones dictated by the USPS ISAL mail requirements. Within each zone, there is included a country code, a country name, the number of lightweight (2 ozs. or less) units or pieces per country and the weight for the number of lightweight pieces per country, the number of heavyweight (over 2 ozs.) pieces per country and the weight for the number of heavyweight pieces per country, the total number of pieces per country and the total weight for the number of pieces per country.

The second breakdown portion is separated into four sections, each for a different international zone established by the USPS. Within each zone, there is included a country code, a country name, the number of regular bags per country and the weight for the number of regular bags per country, the number of M-bags per country and the weight of the number of M-bags per country, the total number of bags per country, and the total weight for the total number of bags per country.

The summary portion includes a breakdown of the four international groups. Each international group is broken down by lightweight mail, heavyweight mail and M-Bags. Within each breakdown, is the number of pieces, the weight in lbs., the rate at which pieces or lbs. will be billed, the total cost of postage for pieces, lbs., or M-Bags within that group, the weight in kilograms, and the total number of bags for that group.

The summary portion of the report also includes a section that gives a breakdown of the subtotals for: the total weight of lightweight mail and its total cost, the total M-Bag weight and its total cost, the total weight of heavyweight mail and its total costs, the total number of pieces of lightweight and heavyweight mail, and the total weight of all lightweight mail minus the discount, to equal the total. From this subtotal, the report generates the total cost of the international surface airlift mail (ISAL) mailing. In each section, the number of pieces, the number of lbs. and the mathematics of the price per piece and price per pound are provided, along with the summary of the total postage rate.

The final report printed, before closing the line and bagging the files 560, is a weight shipped by country comparison report 558. This report will identify the total weight by zone and country for all mail that was processed at the weighing and recordal station 50, and compared to the mail that was weighed out at the weigh out station 60. A discrepancy in this report between the line weight and bag weight for a country will identify a bagging or weigh out error.

Thus, the printed report, in summary, is divided by zones and within each zone, divided into countries in that zone. For each country, the report prints for each line: a unique country code, the country that is represented by that country code, the number of pieces or units of mail for that country which number has been derived by the mathematical calculations based on the calculated control weight and the measured (by the scale) total weight of the mail for that country. Once the piece weight has been established, the system will separate heavyweight mail and lightweight mail.

The overall system and operation performs as follows:

Containers of mail, that can be cardboard boxes, addressed items of mail stacked on a pallet, etc., are received and brought to an intake area. At the intake area, the gross shipment is weighed, and a control number is attached to this particular shipment with a client identifier that is generated by a processing unit, such as, a computer. The mail is then transported to the sorting station where each piece is sorted by individual country of destination. The mail for each country is metered or stamped with a postal permit indicia, then sorted by country. After the mail has been sorted, it is moved, preferably via the conveyor 80, to a processing station, such as a computer station.

For identical items, a control weight per piece is established using the process shown in FIGS. 4B1 and 4B2, and the scale 25. Bundles of mail to each country are then placed on the scale, a unique country code is input and a count of pieces as well as weight to the country is calculated, and recorded and stored. Non-identical items are weighed individually, and then recorded and stored as well using the process shown in FIGS. 4C1 and 4C2. Information stored in the computer includes country of destination, weight per item, sum of all units weighed on the scale at one time, sum of pieces and weight processed in total for a country, and whether or not the mail is lightweight or heavyweight mail. After this data entry, mail travels to a bagging area. The mail bundled by country is removed and placed directly into sacks specifically labeled by country. As a sack is filled (approximately 40 lbs. of mail), it is removed and then weighed via a separate, but linked, computer operation also interfaced with a scale. The total weight of a bag per country is then recorded and stored. The objective is that the weight of the bag that is ready for dispatch should equal the weight of the processed mail.

Upon completion of processing and bagging of all mail various reports are generated. These reports include one for client invoicing that details the number of pieces sent, weight and cost by country for one client's portion of the total commingled mailing. Billing can also be broken down to handle various departments, titles, purchase orders, etc. Additional reports provide data to the USPS for acceptance of mail. This report includes identification of total number of pieces to a country, total number of lightweights to a country, total number of heavyweights to a country, total weight to a country, total weight of lightweights to a country, number of M-Bag mail to a country in the USPS ISAL program, weight of M-Bag mail to a country in the USPS ISAL program, total pieces and weight by each of the four zone categories established by the USPS, total number of bags per country, total weight of bags per country, summary of bags and weight per zone, total cost of postage for lightweight and heavyweight mail.

Further reports offer quality control features. There is a report that compares the weight of mail processed against the weight of mail bagged out by country. Discrepancies identified in this report provide notification that the mail has potentially been placed in the wrong bags and must be checked. As stated above, at or immediately after the weighing and processing station 50, a printer 75 connected to the processing unit 70 prints out a report.

The summary portion of the report can be compared to the information initially inputted into the memory of the computer, namely the total weight of the received mail and the total number of pieces of received mail. This is a check mechanism to verify that all received mail has been accounted for. This report should follow the mail as it is forwarded to the weighout or shipment station 60 where the mail for each country is weighed again and the number of pieces per country can be checked and compared to the report. This serves as a second check of the accuracy of the information provided in this report.

Accordingly, the present system 10 provides (a) recordal of vital information needed to comply with USPS regulations concerning international surface airlift (ISAL) mail, (b) processing of the mail itself, and (c) reports beneficial to the billing of cost centers or clients.

Figure 7A:
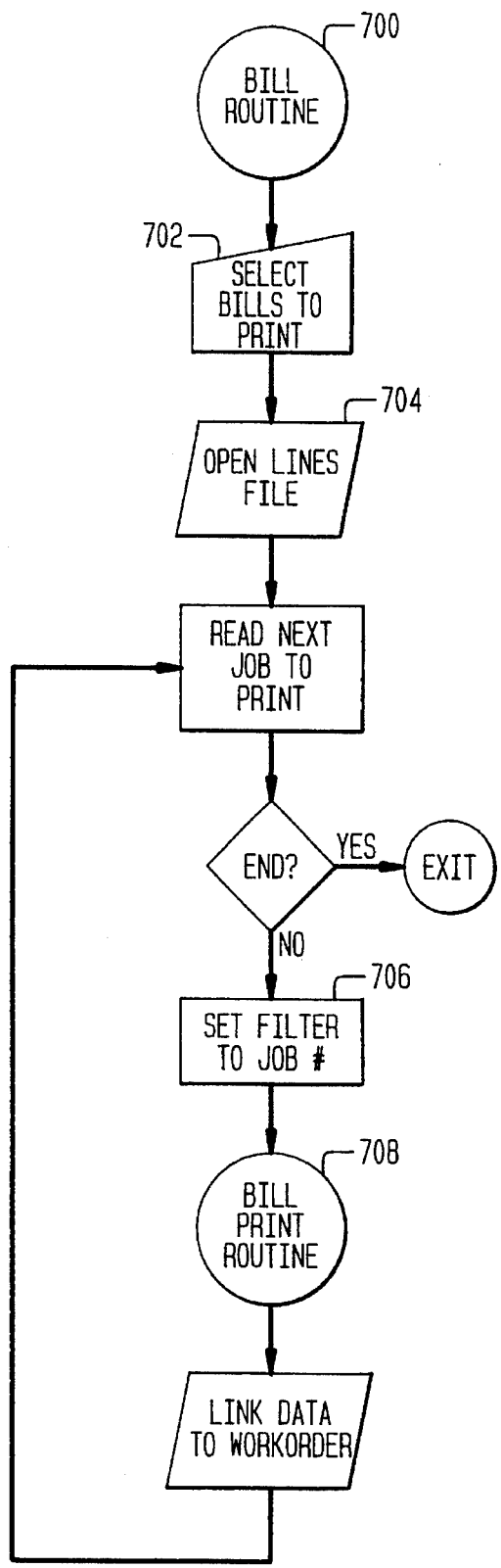
FIG. 7 consists of FIGS. 7A and 7B and are the logic diagrams for the print bills routine for the IPA, ISAL and Valuepost systems.
Figure 7B:
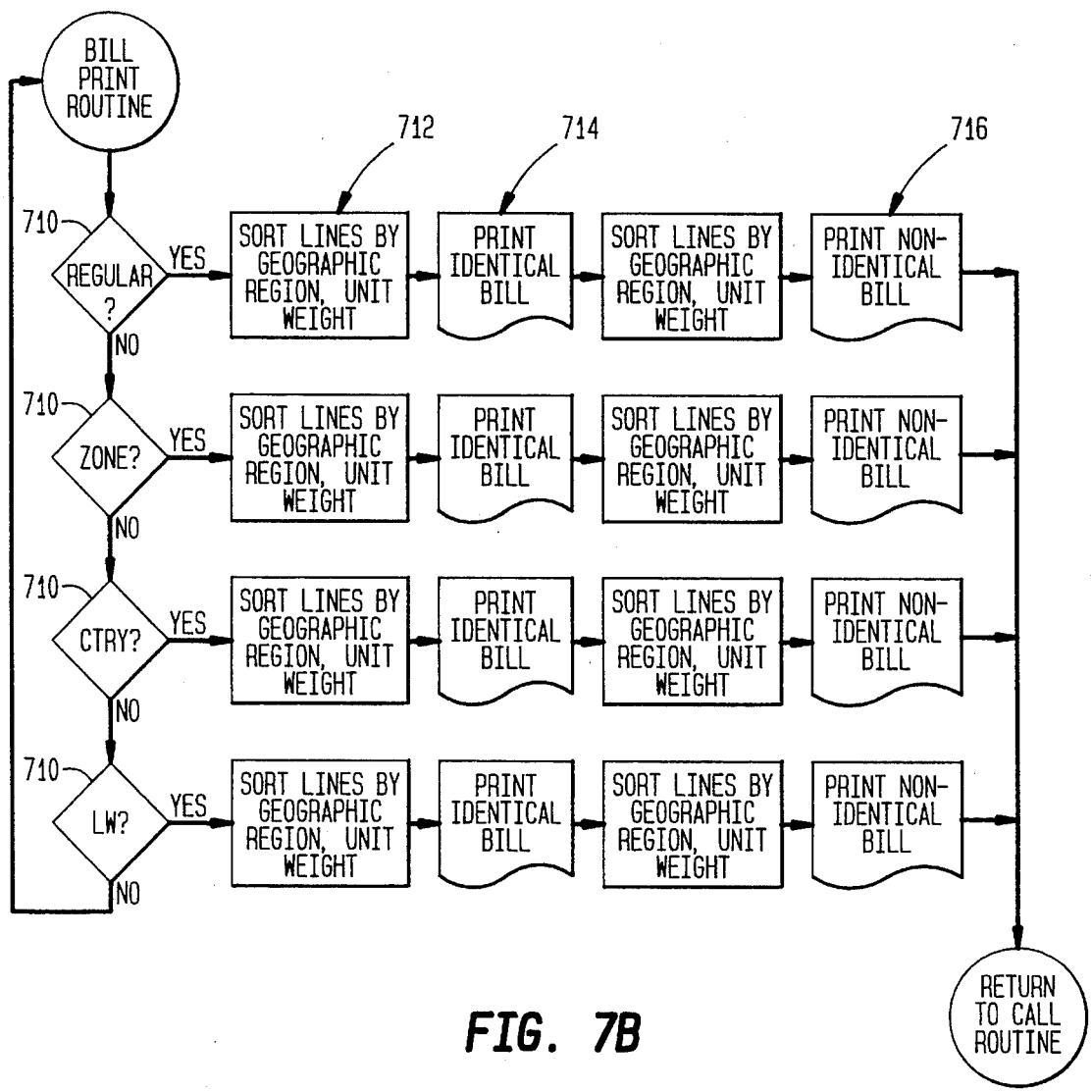

For the benefit of billing to cost centers or clients, the ISAL systems, as well as the IPA and Valuepost systems, have a print bills routine shown in FIGS. 7A and 7B. When the mail first enters the system at station 20, shown in FIG. 1, the mail is given an identification number and client code. As the mail follows through the system, it carries the job number and the client code. When the information is first entered at station 50, the job number is required. Through the job number, the system is able to identify the client that has been assigned this number. When the operator enters the job number, a separate file for that job is created in the processing unit 70, that will store all information regarding mail processed for that job. Once you have processed all the mail that is identified by that job number, you can run the print bills routine.

In the print bills process shown in FIG. 7A and starting at step 700, the operator will identify which bills to print by flagging the job number from the list of bills to print 702. A batch file will be created to store all bills that are to be printed 704. The system will automatically set to the first job number 706 and enter the bill print routine 708.

In the bill routine or process, the flagged job number will also be identified by a billing code. The system will enter the correct billing routine which was set up in the maintenance feature discussed previously 710. Once in the correct billing routine for the desired job, a sort will occur by country, region or unit weight, as desired, as shown in FIG. 7B 712. The processing unit 70 will first send the identical bills 714 and then the nonidentical bills 716 to the printer 75. This sequence will continue until all bills have been printed.

The third customized system called Valuepost is for mail to Canada. The overall system for processing this Valuepost or Canadian mail follows the system 10 shown in FIG. 1. Namely, the system includes: the weigh in station 20 for weighing the total weight of the mail received from an entity; the recordal station 30, either as part of or separate from the weigh in station 20, for recording the total number of containers of mail to Canada and for identifying by a job number or other means the mail received; the affixing station 35, located downstream of the weigh in and recordal stations, for affixing an indicia on each piece of mail, and the mail sorting station 40, located downstream of the affixing station, for sorting the mail by country; the weighing and processing station 50, located downstream of the sorting station, the shipment or weighout station 60, located downstream of the weighing and processing station, for weighing the processed mail prior to shipment, and the processing unit 70 operatively connected to the weigh in and recordal stations, the weighing and processing station, the weighout station and the printer 75.

The weighing and processing station 50 in conjunction with the processing unit 70 establishes a control weight per piece for identical Valuepost mail to a province in Canada. In addition, the weighing and processing station 50 in conjunction with the processing unit 70 determines the total number of pieces per province, as well as the determination of the pieces being a lightweight or a heavyweight in the letter size or flat size category. At the weighing and processing station 50, there is also provided for this customized system a bag tagger 53 that is connected by electrical wiring 95 to the processing unit 70 and the weighing and processing station 50. As the mail is processed at station 50, and the weight requirements are met, a signal is sent to the bag tagger that will cause a bag tag to be printed with the desired bagging information thereon.

While the bag tagger 53 can be the same bag tagger 63 used in the ISAL system, the bag tagger 53 should for the Valuepost system be connected at station 50 instead of station 60.

The weigh in station 20, preferably with scale 25, weighs the total Valuepost mail received from a source or entity, such as, for example, a client or customer or a cost center in a company or association, and automatically stores the weight recorded by the scale in the memory of the processing unit 70.

At the recordal station 30, the number of total containers of Valuepost mail received from the source is recorded into the memory of the processing unit 70. Also, identification information, such as, for example, a work number or a job number for the assignment, the clients name, billing address and the like, are inputted into the memory of the processing unit 70.

At the sorting station 40, the Valuepost is separated or sorted by Canadian province code. The mail is received with an address label thereon that provides the information as to the province destination. At the weighing and processing station 50, all the Valuepost mail is weighed, and the weight is recorded in the processing unit 70. The weighing and processing station 50 establishes a control weight per piece, as well as identifying the piece as a letter size or flat size piece, and then identifying within each category whether the piece is a lightweight or a heavyweight for all identical mail in a Province. The control weight, as discussed above, is established through the use of the weighing means and a processing routine in the processing unit 70 that incorporates the information previously stored in the processing unit.

To establish the control weight, one determines whether there are a number of letter size or flat size pieces, as received from the sorting means 40, that are identical in size and weight. As stated above, to be considered identical in weight, the tolerance or differences in the weight of two packages or letter size pieces must be less than $1/100$ of an ounce. If several pieces are identical, the average weight per piece, or control weight, is obtained as discussed above.

Figure 8A:
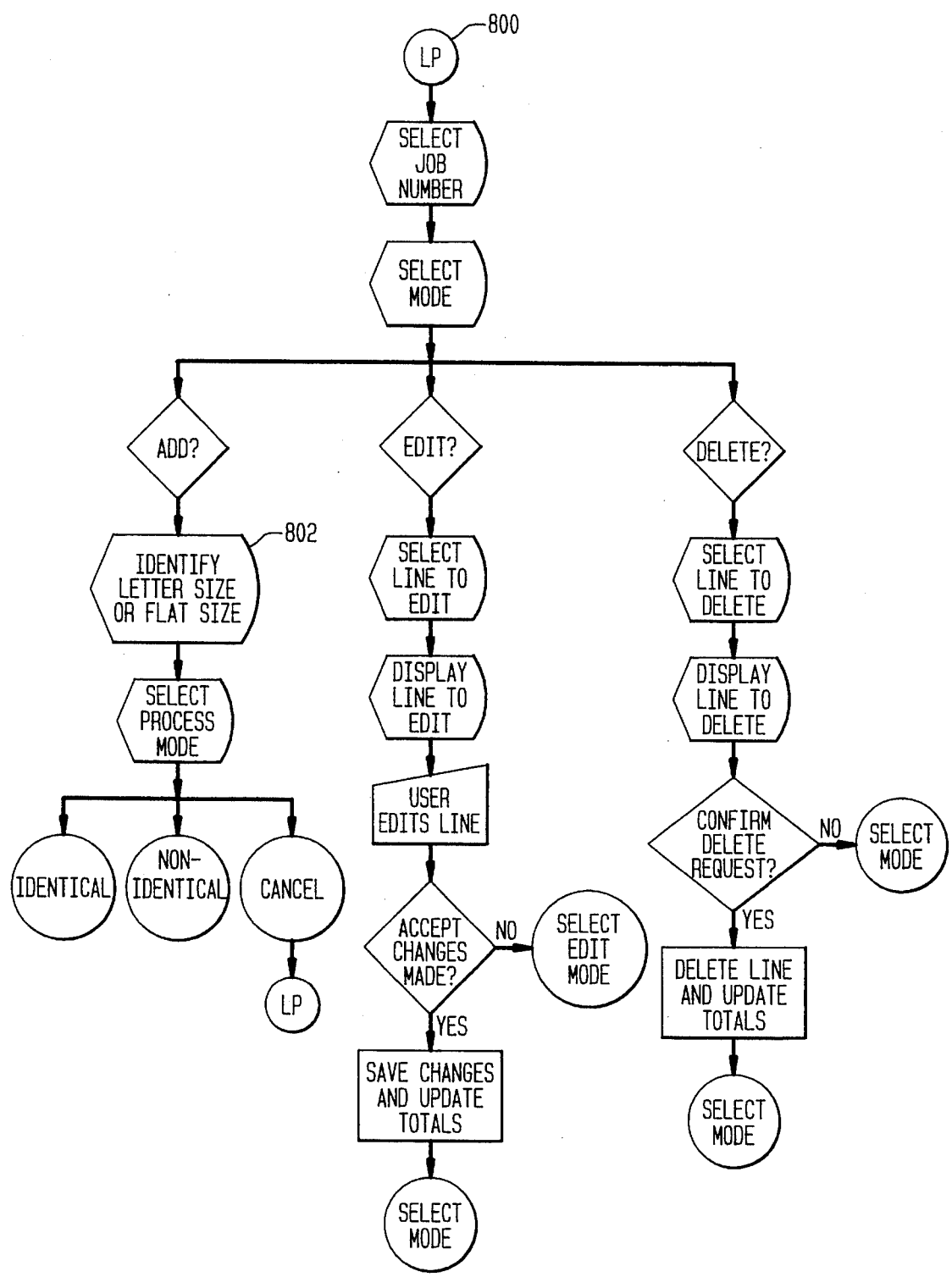
FIG. 8A being the logic diagram of the weighing and processing routine (line process) for the Valuepost system, FIGS. 8B1 and 8B2 being the logic diagrams for the identical routine, while FIGS. 8C1 and 8C2 being logic diagrams of the non-identical routine.

FIG. 8A is the line process routine for the Valuepost system (starting at step 800). It is analogous to FIG. 4A for the ISAL system, except that it provides in the added 802 feature for identifying whether letter size or flat size is to be added.

FIGS. 8B1 and 8B2 is the identical pieces routine and FIGS. 8C1 and 8C2 is the non-identical pieces routine for the Valuepost system. These routines are analogous to those of FIGS. 4B1 and 4B2, and 4C1 and 4C2, respectively, for the ISAL system, except that the Valuepost system uses province codes and the like 804, 806, instead of country codes as well as identifying letter size or flat size mail and the bagging features during the line process.

For the Valuepost system, the input of the number of pieces into the processing unit 70 and the automatic recordal of the weight on the scale 55 and the storing of the recorded weight in the processing unit are variables that in connection with the routine set forth in FIGS. 8B1 and 8B2, provides the average weight per piece for all identical pieces. Once this is achieved, the entire bundle of identical mail can be placed on the scale and the routine in the processing unit 70 will automatically record and store the entire weight. The process or routine in the processing unit 70 will calculate the average weight per piece, and will determine the number of pieces in the bundle.

The memory of the processing unit 70 can store the desired information, such as the province code that has been developed to unambiguously identify by code each territory or province of Canada, each province name, and international zone rate postage information, namely piece (if lightweights) or piece and pound (if heavyweights) rates. In addition, the memory of the processing unit 70 has the ability to receive and change the pricing structure for client billing and department categories, as desired. During the processing of Valuepost mail, after thirty-five (35) pounds of mail has been processed for the same province within the letter size or flat size class, the system will automatically instruct the user to close the bag, as shown in FIGS. 8B2 and 8C1. The system will assign a bag number, print a bag tag, and store all pertinent information.

Figure 9:
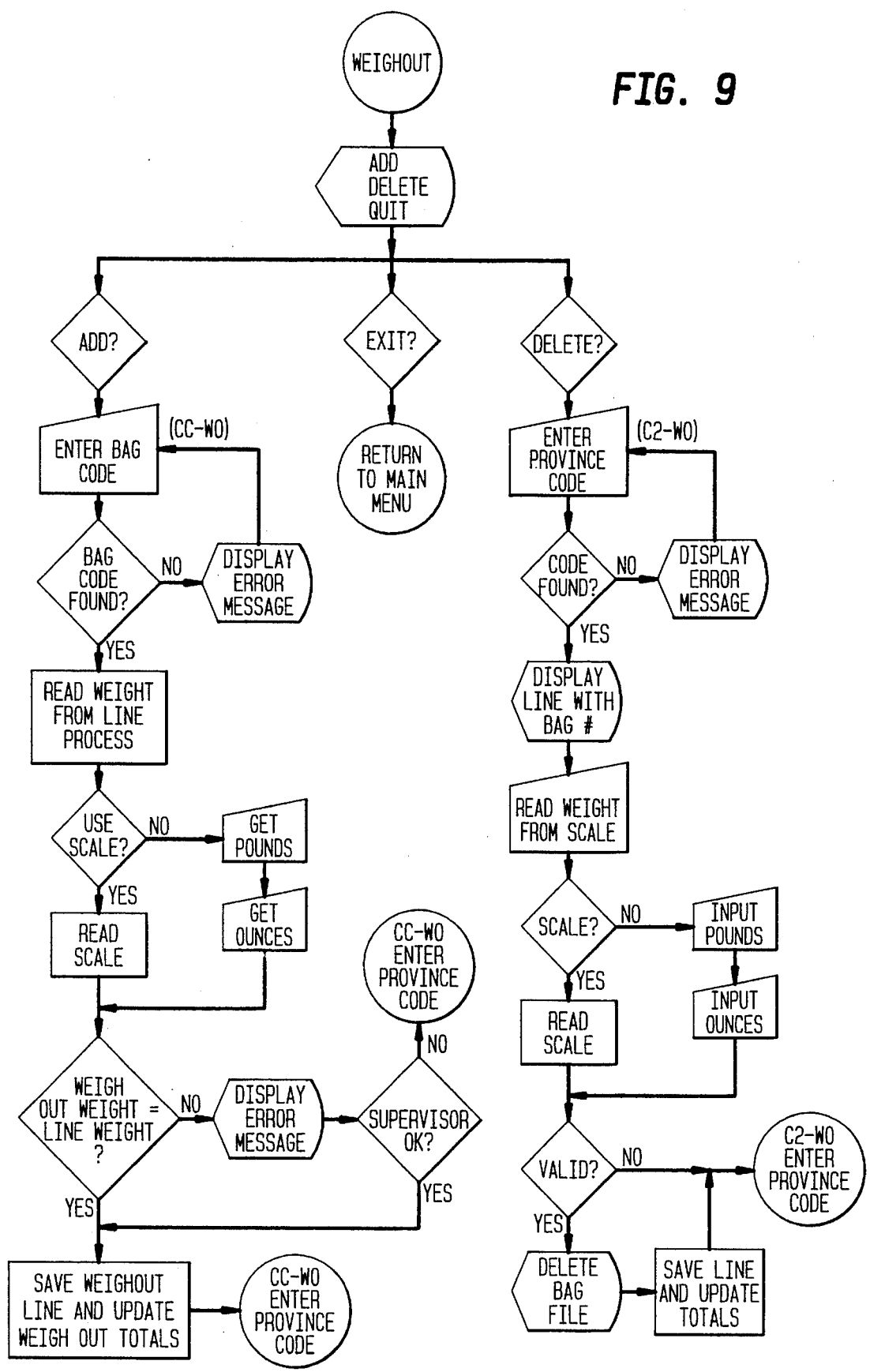
FIG. 9 is the weighout routine for the Valuepost system.

To weighout the processed mail at station 60, the processed mail, i.e. mail that has passed through weighing and processing station 50, has been bagged by country and is placed on scale 65. Referring to FIG. 9 which is the weighout routine that is unique to the Valuepost system, the province code and bag identifier number for that mailbag is entered by the operator. The operator then enters the weight of this bag. If no error message occurs, the system will save the weighout weight and update that province's weighout totals. This weighout process differs from the ISAL systems weighout process in several respects including that there are no M-bags in the Valuepost process. Also, the weighout occurs at a different location than in the ISAL system. Further, the Valuepost system has the unique letter size and flat size dichotomy.

Figure 10:
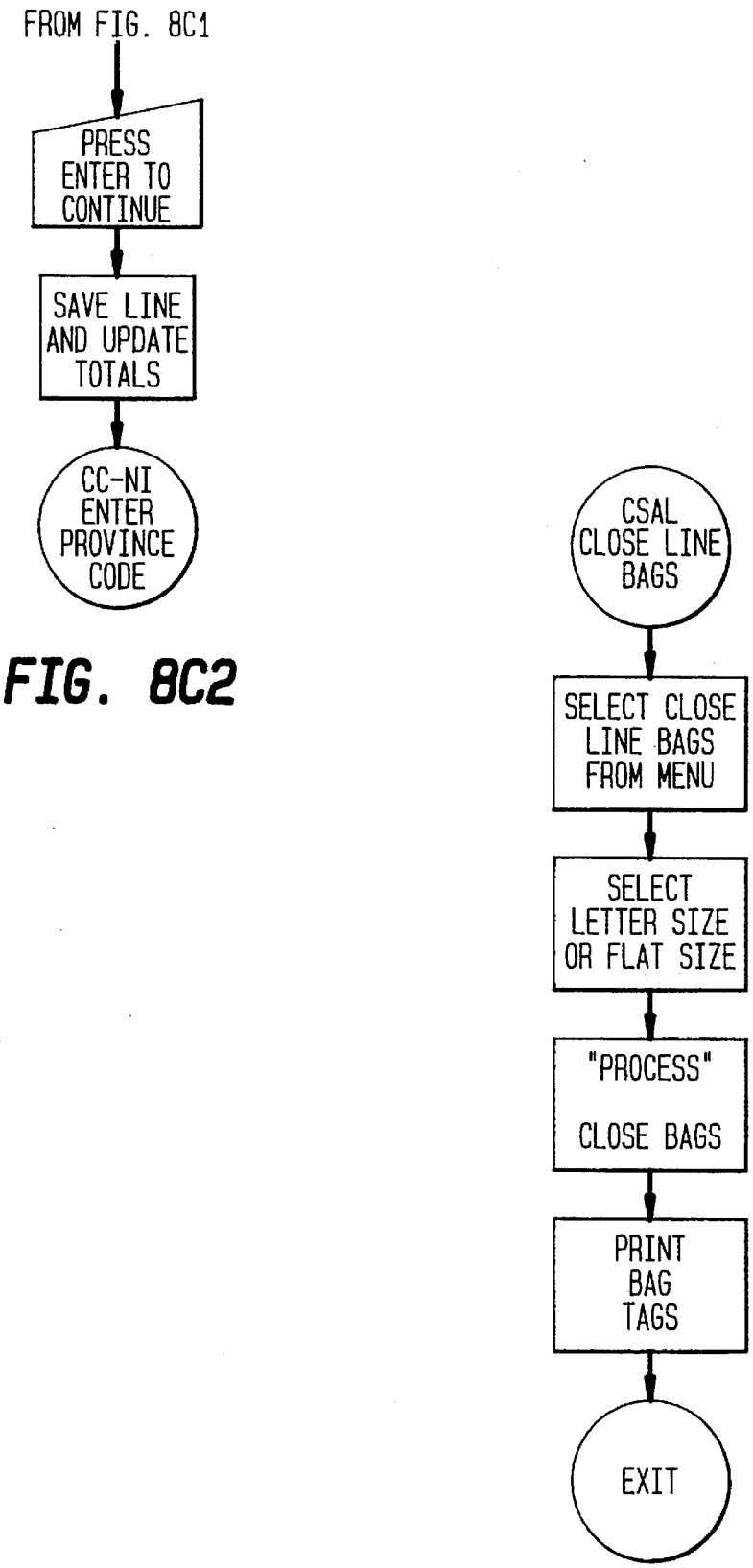
FIG. 10 is the logic routine for printing of Valuepost bag tags prior to Valuepost line close of FIG. 5A.

When the decision has been made to stop processing mail, the close process will begin. As discussed above, the close process comprises four steps including the three steps shown in FIGS. 5a through 5C. The four steps are as follows:

The first step is to print the remaining bag tags that have not been closed during the line process of FIGS. 8B2 and 8C1. As shown in FIG. 10, the operator at station 50 chooses the close line bag routine and must select either or both the letter size or flat size bags selection. The system will print the bag tags for each bag of mail that has been processed, and not yet closed.

The second step is the line close process shown in FIG. 5A in which the information entered at station 50 will be processed for this close, and flag it as belonging to the current close. Then, it will zero all close storage files from the previous close, and update that file with the current line totals. Next, the program will zero the line totals that were saved from the information generated at station 50. The system will now set the Valuepost close flag=YES. This flag will indicate that a line close has been run, and will not allow processing of any mail through station 50 until the flag has been set=No by the weighout close process.

The third step is the Valuepost weighout close process shown in FIG. 5B which takes all information that has been entered at the weighout station 60 for this close, and flag it as belonging to the current close. A safety feature provided in this system will not allow a weighout close process to be run unless the line close process has been run. It will then zero all close storage files from the previous weighout close, and update that file with the current bag totals. Next, the program will zero the bag totals that were saved from the information generated at station 60. The system will now set the close flag=No. This flag will indicate that the line close and weighout close processes have each been run, and will allow for the processing at station 50 to resume.

The fourth step is the Valuepost close report process that is analogous to that shown in FIG. 5C, except the sort line file and the sort bag file is by province and province code, instead of country group, country and country code used in the ISAL system. As with ISAL, the Valuepost close process is run after both the line close and weighout close processes have been run. The Valuepost close process is also normally initiated from a remote location as is the case with the ISAL close report process. This report follows the following sequence: (a) the program will open the Valuepost line and bags files that were created by the previous processes or routines, (b) the line file will be sorted by letter size then flat size, lightweight and heavyweight and then by weight and province, and then separated by lightweight and heavyweight, (c) the line report will then be generated.

The bag file will be sorted by letter size and flat size classes and then by province and province code within each class. A total count of the R or regular bags with their weight will be provided. The bag report will be generated. The system will then calculate and print a postal shipment summary from the Valuepost line and Bag report.

The following reports are generated by the Valuepost mailing program.

First, a line process breakdown by region report provides a detailed breakdown of both letter and flat size pieces that have been processed at station 50, separated by region, and then broken down within that region by lightweight and heavyweight mail. Specifically, it separates the letter and flat size pieces, showing the total weight shipped to each province. Within each class, there is included a region code, a region name, the number of bags for each letter size or flat size per region, and the weight in both pounds and kilograms.

Second, a bag close weight by region report that separates the letter size and flat size bags, and then within each of these two provides a breakdown of bags to each province, and the weight of those bags in both pounds and kilograms.

Third, a line process bag breakdown report is provided based on the information that is created at station 50. Each bag closed during the line process or at the finish of line processing prior to close, is broken down by letter and flat sizes. Within each letter and flat size, the bags are then broken down by bag number, and then each bag is broken down by lightweight and heavyweight, and the total weight. This is basically a breakdown of the letter and flat sizes, with each size broken down by bag (which was created during the processing routine), and then separated by lightweights and heavyweights within that bag.

Fourth, the postal or total shipment summary report provides the cost breakdown for the letter size mail. It takes the number of letter size mail weighing 1 oz. or less (Valuepost letter size lightweight) and multiplying that number by the fixed rate, presently 28 cents. It then takes the total pieces of letter class mail over one (1) ounce (Valuepost letter size heavyweight) and multiplies that by the fixed rate, presently 26 cents, and the total pounds of Valuepost letter size heavyweight by 40 cents per pound. The total shipment summary also provides a cost breakdown for flat size class by taking the number of flat size class mail weighing 5 ozs. or less (Valuepost flat size lightweight) and multiplying that by the present fixed rate of 53 cents. It then takes the total pieces of flat size class mail over 5 ounces (Valuepost flat size heavyweight) and multiplies that by the present fixed rate of 30 cents, and the total pounds of Valuepost flat size heavyweight mail by one (1) dollar per pound. As with the ISAL system, this summary report can be compared to the information initially inputted into the memory of the processing unit, namely the total weight of the received Valuepost mail and the total number of pieces of received Valuepost mail. This is a check mechanism to verify that all received Valuepost mail has been accounted for.

Fifth, a facsimile report according to form PS 3651-c that is the present accepted statement of mailing by the USPS. The information to complete this form was derived from the postal shipment summary report.

Sixth, the line process vs. bag close report is a comparison report that breaks down the letter size and flat size mail by province, and then compares the weight by province that was processed at station 50 with the bag weight by province that was weighed out and generated at station 60. An error in this report indicates a bagging error.

For the benefit of billing to cost centers or clients, the Valuepost procedure has a print bills routine, the same as that shown in FIGS. 7A and 7B for the ISAL system, except as indicated to the contrary below.

When the mail first enters the system at station 20, shown in FIG. 1, the mail is given an identification number and client code. As the mail follows through the system to the next computer operated step at station 50, it carries the job number and the client code. When the information is first entered at station 50, the job number is required in order to identify the mail. Through the job number, the system is able to identify the client that has been assigned this number. When the operator enters the job number, a separate file for that job is created in the memory of the processing unit 70, that will store all information regarding mail processed for that job. Once you have processed all Valuepost mail that is identified by that job number, you can run the print bills routine.

In the print bills routine, the operator will identify which bills to print by flagging the job number from the list of bills to print. A batch file will be created to store all bills that are to be printed. The system will automatically set to the first job number and enter the bill print routine.

In the bill print routine, the flagged job number will also be identified by a billing code. The system will enter the correct billing routine that was set up in the maintenance utility discussed previously. Once in the correct billing routine for the desired job, a sort will occur by province, region or unit weight as desired. The processing unit 70 will first send the identical bills and then the non-identical bills to the printer 75. This sequence will continue until all bills have been printed.

The overall system and operation of the Valuepost system is somewhat analogous to that described above for the ISAL system. However, in the Valuepost system, each item is sorted by individual province of destination instead of country, and there are not four different international zones. Moreover, the Valuepost system provides for the letter and flat size dichotomy. Also, bundles of mail to each province are weighed, a unique province code is input and a count of pieces as well as weight to the province is calculated. Further, information stored in the memory of the processing unit includes province of destination, and the sum of pieces segregated by lightweight and heavyweight mail, and weight processed in total for a province. Still further, mail is bundled by province and a facing slip that identifies the Canadian postal code of that mail is placed on the front of the bundle, and then the bundle is placed directly into sacks specifically labeled by province. The printed bag tag will print out the province code for that bag, as well as other information.

Upon completion of processing and bagging of all mail various reports are generated. These reports include identification of total number of pieces to a province, total number of lightweight pieces, separated by letter size and flat size to a province, total number of heavyweight pieces, separated by letter size and flat size to a province, total weight to a province, total pieces and weight by each of the provinces established by the USPS, total number of bags per province, total weight of bags per class, summary of bags and weight per province, total cost of postage for lightweight and heavyweight mail, and a facsimile report of the PS Form 3651-C. These reports are unique to the Valuepost system and the requirements for Valuepost mail set forth by the USPS.

Further reports offer quality control features. There is a report that compares the weight of mail processed against the weight of mail bagged out by province. Discrepancies identified on this report provide notification that the mail has potentially been placed in the wrong bags and must be checked.

The present invention may, of course, be carried out in other specific ways than those set forth herein without departing from the spirit and essential characteristics of the present invention. The present embodiments are, therefore, to be considered in all respects as illustrative and not restrictive, and to provide for all changes coming within the meaning and equivalency range the appended claims are intended to embrace.

Wherefore I claim:

1. A system for processing international mail comprising:

means for weighing the total weight of received mail, for recording the total number of pieces of mail and for establishing identification criteria for the mail in the system;

means for affixing indicia onto the mail after the mail has been weighed and recorded;

means for sorting the mail by desired geographic region after the indicia has been affixed thereon;

processing means, operatively connected to the weighing and recording means, for storing received information and for processing the stored information to derive processed information;

means for weighing and processing the sorted mail, said weighing and processing means being operatively connected to the processing means; and weighout means, located downstream of the weighing and processing station, for weighing the processed mail, wherein the weighing and processing means in conjunction with the processing means establishes a control weight per piece for identical pieces of mail to be sent to each geographic region; and means for generating a report based on the information processed by the processing means, wherein the report categories the mail by desired geographic region and by weight.

2. The system according to claim 1, wherein the processed information includes a breakdown of the mail into lightweight pieces and heavyweight pieces, and a total number of pieces of mail per geographic region.

3. The system according to claim 1, wherein:

the weighing and processing means derives a total weight by geographic region; and the processing means receives an input, said input including a total number of pieces per geographic region;

wherein the processing means calculates the number of pieces in each geographic region and separates the pieces of mail into lightweight and heavyweight mail based on the total weight by geographic region the calculated control weight and the total number of pieces per geographic region.

4. The system according to claim 1, further comprising a close process that comprises a line close step, a weighout close step and a close report step.

5. The system according to claim 1, wherein the system checks the weight for each geographic region of mail that has been processed at the processing means by comparing the processed weight derived from the processing means against the weight derived at the weighout means.

6. The system according to claim 5, wherein an error message is generated if the weight derived at the weighout means is greater than the processed weight.

7. The system according to claim 1, wherein the control weight is established by determining whether there are a number of pieces received from the sorting means that are identical, and determining the average weight per piece by selecting a desired number of identical pieces and weighing the total weight and dividing by the number of pieces weighed.

8. The system of claim 7, wherein identical pieces are the same in size and weight or have a difference in the weight of less than 1/100 of an ounce.

9. The system according to claim 1, wherein:

each geographic region is a different province of Canada;

the weighing and processing means derives a total weight by geographic region; and the processing means receives an input, .said input including a total number of pieces per geographic region;

the processing means calculates the number of pieces of mail by province and separates the pieces of mail into lightweight pieces and heavyweight pieces based on the total weight by province the calculated control weight and the total number of pieces per province.

10. The system according to claim 9, wherein the processed information will include a line process breakdown by province report, a bag close weight by province report, a line process bag breakdown report, a total shipment summary report, and a line process vs. bag close report.

11. The system according to claim 1, wherein the processed information includes a breakdown in which the mail is separated into a letter size category and a flat size category.

12. The system according to claim 11, wherein the processed information includes a breakdown of the letter size and flat size pieces of mail by geographic region and within each geographic region by lightweight and heavyweight mail.

13. The system according to claim 1, wherein each geographic region is a different country or province of the world and wherein the processed information includes a breakdown portion and a summary portion with the breakdown portion being separated into four sections each referencing a different international zone, wherein each international zone references at least one geographic region.

14. The system according to claim 13, wherein the processed information includes a breakdown of the mail into lightweight mail and heavyweight mail for each international zone.

15. The system of according to claim 14, wherein within each breakdown of the processed information further includes a country code, a country name, the number of pieces of heavyweight mail and the weight of the heavyweight pieces, the number of pieces of lightweight and the weight of the lightweight pieces, and a total of all pieces of mail and the total weight of all pieces of mail.

16. The system according to claim 1, further comprising a close process that comprises a print bag tag step, a line close step, a weighout close step and a close report step.

17. The system according to claim 10, wherein the bag close weight by province report separates the letter size bags and flat size bags, within each provides a breakdown of bags to each province and the weight of the bags in both pounds and kilograms.

18. The system according to claim 10, wherein the line process bag breakdown report is based on the information from the weighing and processing means and is a breakdown of a letter size mail and a flat size mail, with each broken down by bag and separated into lightweight and heavyweight mail within that bag.

19. The system according to claim 10, wherein the line process vs. bag close report is a comparison report that breaks down letter size and flat size mail by province, and compares the weight by province generated by the processing and weighing means with the bag weight by province of the weighout means to determine an error.

20. A method for processing international mail, the method comprising the steps of:

weighing the total weight of the mail;

recording the total number of units of the mail and for establishing identification criteria for the mail in the system;

affixing indicia onto the mail after the mail has been weighed and recorded;

sorting the mail by geographic region after the indicia has been affixed thereon;

weighing the mail and recording unit number information after the mail has been sorted; and storing received information processing the stored information to derive processed information and determining the total number of units of mail per geographic region;

categorizing the mail by desired geographic region and by weight; and generating a report based on the processed information.

* * * * *